US012595189B2

(12) United States Patent
Hayashi et al.

(10) Patent No.: US 12,595,189 B2
(45) Date of Patent: Apr. 7, 2026

(54) METAL COMPOSITE HYDROXIDE AND METHOD FOR PRODUCING THE SAME, POSITIVE ELECTRODE ACTIVE MATERIAL FOR LITHIUM ION SECONDARY BATTERY AND METHOD FOR PRODUCING THE SAME, AND LITHIUM ION SECONDARY BATTERY USING THE SAME

(71) Applicant: SUMITOMO METAL MINING CO., LTD., Tokyo (JP)

(72) Inventors: Tetsutaro Hayashi, Niihama (JP); Shinsuke Suganuma, Niihama (JP); Shuuzou Ozawa, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 931 days.

(21) Appl. No.: 17/287,726

(22) PCT Filed: Oct. 21, 2019

(86) PCT No.: PCT/JP2019/041267
§ 371 (c)(1),
(2) Date: Apr. 22, 2021

(87) PCT Pub. No.: WO2020/085283
PCT Pub. Date: Apr. 30, 2020

(65) Prior Publication Data
US 2021/0395105 A1 Dec. 23, 2021

(30) Foreign Application Priority Data

Oct. 26, 2018 (JP) ................................. 2018-201708

(51) Int. Cl.
*C01G 53/04* (2025.01)
*H01M 4/02* (2006.01)
(Continued)

(52) U.S. Cl.
CPC ............ *C01G 53/04* (2013.01); *H01M 4/366* (2013.01); *H01M 4/505* (2013.01); *H01M 4/525* (2013.01);
(Continued)

(58) Field of Classification Search
CPC ...... C01G 53/04; H01M 4/366; H01M 4/505; H01M 4/525; H01M 10/0525;
(Continued)

(56) References Cited

U.S. PATENT DOCUMENTS

2009/0104530 A1    4/2009  Shizuka et al.
2014/0011090 A1*  1/2014  Toya ..................... H01M 4/505
                                                        429/223
(Continued)

FOREIGN PATENT DOCUMENTS

JP        2008-305777 A    12/2008
JP        2012-079608 A     4/2012
(Continued)

OTHER PUBLICATIONS

Yoshiyuki Nakano et al 2013 ECS Trans. 50 261 (Year: 2013).*
(Continued)

*Primary Examiner* — Matthew T Martin
*Assistant Examiner* — Bartholomew A Hornsby
(74) *Attorney, Agent, or Firm* — WHDA, LLP

(57) ABSTRACT

A method for producing a metal composite hydroxide, which includes a first crystallization process of supplying a first raw material aqueous and performing a crystallization reaction and a second crystallization process of supplying a second raw material aqueous solution containing a more amount of tungsten than the first raw material aqueous solution and performing a crystallization reaction to form a tungsten-concentrated layer and in which switching of reaction atmosphere from either atmosphere of a non-oxidizing
(Continued)

atmosphere or an oxidizing atmosphere to the other atmosphere is performed two or more times in particle growth and the time for supplying the second raw material aqueous solution into the reaction tank in the non-oxidizing atmosphere is 50% or more with respect to the entire time for supplying the second raw material aqueous solution into the reaction tank.

3 Claims, 8 Drawing Sheets

(51) Int. Cl.
| | | |
|---|---|---|
| *H01M 4/36* | (2006.01) | |
| *H01M 4/505* | (2010.01) | |
| *H01M 4/525* | (2010.01) | |
| *H01M 10/0525* | (2010.01) | |

(52) U.S. Cl.
CPC ..... *H01M 10/0525* (2013.01); *C01P 2002/74* (2013.01); *C01P 2004/51* (2013.01); *C01P 2006/11* (2013.01); *C01P 2006/12* (2013.01); *H01M 2004/021* (2013.01); *H01M 2004/028* (2013.01)

(58) Field of Classification Search
CPC ....... H01M 2004/021; H01M 2004/028; C01P 2002/74; C01P 2004/51; C01P 2006/11; C01P 2006/12; C01P 2002/60
See application file for complete search history.

(56) References Cited

U.S. PATENT DOCUMENTS

| | | | |
|---|---|---|---|
| 2014/0087263 A1 | 3/2014 | Matsumoto et al. | |
| 2014/0106228 A1* | 4/2014 | Toya ..................... | H01M 4/134 |
| | | | 429/223 |

| | | | |
|---|---|---|---|
| 2014/0377660 A1* | 12/2014 | Fukui ................ | H01M 10/0525 |
| | | | 427/126.3 |
| 2016/0093885 A1* | 3/2016 | Kamata ................. | H01M 4/505 |
| | | | 429/223 |
| 2016/0244336 A1 | 8/2016 | Toya et al. | |
| 2016/0248091 A1 | 8/2016 | Toya et al. | |
| 2016/0322627 A1 | 11/2016 | Yoshida et al. | |
| 2017/0050864 A1* | 2/2017 | Matsumoto .......... | C01G 45/125 |
| 2018/0254511 A1* | 9/2018 | Park ...................... | H01M 4/525 |
| 2019/0263675 A1* | 8/2019 | Yoshida ................ | H01M 4/131 |

FOREIGN PATENT DOCUMENTS

| | | |
|---|---|---|
| JP | 2012-246199 A | 12/2012 |
| JP | 2012-252844 A | 12/2012 |
| JP | 2013-125732 A | 6/2013 |
| JP | 2013-147416 A | 8/2013 |
| JP | 2014-197556 A | 10/2014 |
| JP | 2016-094307 A | 5/2016 |
| JP | 2016-210674 A | 12/2016 |
| JP | 2018-104274 A | 7/2018 |
| JP | 2019-189489 A | 10/2019 |

OTHER PUBLICATIONS

International Search Report dated Jan. 28, 2020, issued in counterpart Application No. PCT/JP2019/041267, with English Translation. (5 pages).
International Preliminary Report on Patentability (Form PCT/IB/373) issued in counterpart International Application No. PCT/JP2019/041267 dated Apr. 27, 2021, with Form PCT/ISA/237. (15 pages).

* cited by examiner

METAL COMPOSITE HYDROXIDE AND METHOD FOR PRODUCING THE SAME, POSITIVE ELECTRODE ACTIVE MATERIAL FOR LITHIUM ION SECONDARY BATTERY AND METHOD FOR PRODUCING THE SAME, AND LITHIUM ION SECONDARY BATTERY USING THE SAME

TECHNICAL FIELD

The present invention relates to a metal composite hydroxide and a method for producing the same, a positive electrode active material for lithium ion secondary battery and a method for producing the same, and a lithium ion secondary battery using the same.

BACKGROUND ART

In recent years, with widespread use of small-sized information terminals such as smartphones and tablet PCs, development of small and lightweight secondary batteries having a high energy density has been desired. Development of high-output secondary batteries is strongly desired as a power source for driving vehicles such as hybrid electric cars, plug-in hybrid electric cars, and battery-powered electric cars.

As secondary batteries satisfying such requirements, there are lithium ion secondary batteries which are a kind of non-aqueous electrolyte secondary battery. Lithium ion secondary batteries are equipped with a negative electrode, a positive electrode, an electrolyte solution and the like, and a material capable of de-inserting and inserting lithium is used as an active material used as a material for the negative electrode and positive electrode.

Among lithium ion secondary batteries, lithium ion secondary batteries in which a layered or spinel type lithium-metal composite oxide is used as the positive electrode active material can provide a voltage of 4 V class and thus are currently being actively researched and developed as batteries having a high energy density, and some of them are being put into practical use.

As a positive electrode active material of such lithium ion secondary batteries, lithium-metal composite oxides such as lithium cobalt composite oxide ($LiCoO_2$) that is relatively easily synthesized, lithium nickel composite oxide ($LiNiO_2$) using nickel that is cheaper than cobalt, lithium nickel cobalt manganese composite oxide ($LiNi_{1/3}CO_{1/3}Mn_{1/3}O_2$), lithium manganese composite oxide ($LiMn_2O_4$) using manganese, and lithium nickel manganese composite oxide ($LiNi_{0.5}Mn_{0.5}O_2$) have been proposed.

Meanwhile, a method is generally known in which the specific surface area of the positive electrode active material is increased in order to further improve the output characteristics of lithium ion secondary battery. The reaction area with the electrolyte solution can be sufficiently secured when the positive electrode active material is incorporated into the secondary battery when the specific surface area of the positive electrode active material is increased. Accordingly, several techniques for improving output characteristics by controlling the particle structure of positive electrode active material have been proposed.

For example, Patent Literatures 1 to 3 propose a method for producing a positive electrode active material using a composite hydroxide obtained by a crystallization process performed in two stages as a precursor. The positive electrode active materials described in these Patent Literatures are said to have a high specific surface area and excellent output characteristics as they have a small particle size, narrow particle size distribution, and a hollow structure or a space section inside the particles. However, a positive electrode active material exhibiting higher output characteristics is required, for example, as a power source for driving vehicles such as hybrid vehicles.

On the other hand, addition of dissimilar elements to the lithium-metal composite oxide constituting a positive electrode active material has been investigated as a means for further decreasing the reaction resistance and realizing a positive electrode active material exhibiting higher output characteristics. As such dissimilar elements, for example, transition metals capable of taking a high valence such as Mo, Nb, W, and Ta have been proposed.

For example, in Patent Literature 4, a lithium-transition metal-based compound powder is described which contains a lithium-transition metal-based compound having a function capable of inserting and de-inserting lithium ions as a main component and is obtained by adding at least one or more additives for suppressing particle growth and sintering when firing to the main component raw material at a proportion of 0.01 mol % or more and less than 2 mol % with respect to the total molar amount of transition metal elements in the main component raw material and then performing firing. It is described that the additive is an oxide containing at least one or more elements selected from the group consisting of Mo, W, Nb, Ta, and Re and the atomic ratio of the sum of the additive elements with respect to the sum of the metal elements other than Li and additive elements at the surface part of the primary particles is 5 times or more the atomic ratio of the whole particles.

In Patent Literature 5, a production method is proposed in which fine particles containing lithium tungstate represented by any of $Li_2WO_4$, $Li_4WO_5$, or $Li_6W_2O_9$ are formed on the surface of the lithium-metal composite oxide powder or the surface of primary particles of the powder by performing a process of adding an alkaline aqueous solution in which a tungsten compound is dissolved at a specific proportion to a lithium-metal composite oxide powder and mixing these together to disperse W on the surface of primary particles of this powder and subjecting the mixture of the alkaline aqueous solution in which a tungsten compound is dissolved and the lithium-metal composite oxide powder to a heat treatment in a range of 100° C. to 700° C.

In Patent Literature 6, a positive electrode active material is proposed which is a positive electrode active material containing a lithium-metal composite oxide, includes primary particles and secondary particles formed by aggregation of primary particles, and has a compound layer which contains concentrated tungsten and lithium and has a thickness of 20 nm or less on the surface or at grain boundary of lithium-metal composite oxide as well as has voids through which the electrolyte solution can penetrate in the vicinity of and inside the surface of secondary particles. As a preferable method for obtaining the powder, a tungsten compound is mixed together when a composite hydroxide or a composite oxide is mixed with a lithium compound and the mixture is fired to obtain a lithium-metal composite oxide, but it is preferable that the particle size of the tungsten compound is ⅕ time or less the average particle size of manganese composite hydroxide or manganese composite hydroxide in this method.

Patent Literature 7 proposes a method for producing a transition metal composite hydroxide, which includes a process of producing composite hydroxide particles by separating the nuclear generation process and the particle growth stage by pH control in the crystallization reaction and a coating process of forming a coating containing tungsten on the surface of the composite hydroxide particles obtained, and a positive electrode active material obtained using the hydroxide as a precursor.

Patent Literature 8 proposes a positive electrode for lithium secondary battery in which a layer of a first positive electrode active material represented by $Li_{x1}Ni_{a1}Mn_{b1}Co_{c1}O_2$ is attached to the surface of the current collector and a layer of a second positive electrode active material represented by $Li_{x2}Ni_{a2}Mn_{b2}CO_{c2}M_dO_2$ (M is Mo, W, and Nb) is attached to the surface of the first positive electrode active material.

Patent Literature 9 proposes a method for producing a nickel-cobalt composite hydroxide, which includes a first crystallization process of obtaining nickel-cobalt composite hydroxide particles by separately and simultaneously supplying a solution containing nickel, cobalt, and manganese, a complex ion forming agent, and a basic solution to one reaction vessel and a second crystallization process of crystallizing composite hydroxide particles containing nickel, cobalt, manganese, and element M (at least one or more elements selected from the group consisting of Al, Mg, Ca, Ti, Zr, Nb, Ta, Cr, Mo, W, Fe, Cu, Si, Sn, Bi, Ga, Y, Sm, Er, Ce, Nd, La, Cd, and Lu) on the nickel-cobalt composite hydroxide particles by further separately and simultaneously supplying a solution containing nickel, cobalt, and manganese, a complex ion forming agent, a basic solution, and a solution containing element M after the first crystallization process and in which $0.30 \leq MOL(1)/\{MOL(1)+MOL(2)\} < 0.95$, where MOL (1) denotes the total mole of nickel, cobalt, and manganese supplied in the first crystallization process and MOL (2) denotes the total mole of nickel, cobalt, and manganese supplied in the second crystallization process.

CITATION LIST

Patent Literature

Patent Literature 1: JP 2012-246199 A
Patent Literature 2: JP 2013-147416 A
Patent Literature 3: JP 2016-094307 A
Patent Literature 4: JP 2008-305777 A
Patent Literature 5: JP 2013-125732 A
Patent Literature 6: JP 2014-197556 A
Patent Literature 7: JP 2012-252844 A
Patent Literature 8: JP 2012-079608 A
Patent Literature 9: JP 2016-210674 A

SUMMARY OF INVENTION

Technical Problem

However, in the method described in Patent Literature 4, there is a problem that some of the additive elements such as Mo, Ta, and W are substituted with Ni disposed in a layered form in crystal and the battery characteristics such as battery capacity and cycle characteristics deteriorate.

In the lithium-metal composite oxide fabricated by the production method described in Patent Literature 5, the output characteristics are improved but the cycle characteristics are not sufficient in some cases when the thickness of tungsten fine particles formed on the particle surface is not uniform.

The method described in Patent Literature 6 is not industrially suitable and is not easy to handle since it is necessary to once grind the tungsten compound in order to obtain a tungsten compound in nano order. The thickness of the compound layer varies as the particle sizes of the fine particles obtained are non-uniform, thus the reaction resistance insufficiently decreases, and the effect of improving the output characteristics is limited. It is also described that tungsten is contained in manganese composite hydroxide as an additive element in order to obtain the powder, but it is difficult to form a compound layer containing concentrated tungsten in nano order by this method.

The method described in Patent Literature 7 is not industrially preferable since a process of coating tungsten is added and the number of processes increases. Tungsten is deposited by controlling the pH in the coating process, but the thickness of coating layer is not uniform by the fluctuation of controlled pH, and it is thus difficult to uniformly coat tungsten. There is a problem that the coating layer of tungsten becomes resistance and the output rather decreases in the case of using a composite oxide obtained by mixing lithium with a composite hydroxide non-uniformly coated with tungsten.

The positive electrode active material fabricated by the method described in Patent Literature 8 has a problem that there is divergence in the structural change at the time of the charge and discharge reaction when being used in a secondary battery since the first positive electrode active material and the second positive electrode active material are different phases, cracking occurs while charge and discharge is repeated, and cycle characteristics deteriorate.

It is described that the composite hydroxide and positive electrode active material obtained by the method described in Patent Literature 9 has a peak of element M by SEM-EDX spectrum in the second layer having a depth proportion of 5% or more and less than 50% in the radial direction, the element M including tungsten is contained in the inner side than the surface layer of the secondary particles in the positive electrode active material, and thus there is a possibility that the crystallinity decreases and the battery characteristics decrease when being used in a secondary battery.

As a result of diligent studies, the present inventors have found out a problem that the amount of tungsten contained in the obtained metal composite hydroxide (precursor) with respect to the amount of tungsten supplied (added amount) is not sufficient (the yield of tungsten is not sufficient) in some cases when a raw material aqueous solution containing tungsten is supplied in the crystallization process.

In view of such problems, an object of the present invention is to provide a positive electrode active material having decreased reaction resistance (positive electrode resistance), a higher output, and high crystallinity when being used in a positive electrode of a secondary battery, a metal composite hydroxide that is a precursor of the positive electrode active material, and a method for producing the metal composite hydroxide. The method for producing a metal composite hydroxide of the present invention is intended to provide a method for producing a metal composite hydroxide having an improved yield of tungsten.

Solution to Problem

In a first embodiment of the present invention, there is provided a method for producing a metal composite hydroxide that contains nickel, manganese, and tungsten and optionally cobalt and element M and has a mass ratio of the respective metal elements represented by Ni:Mn:Co:W: M=x:y:z:a:b (x+y+z=1, $0.3 \leq x \leq 0.95$, $0.05 \leq y \leq 0.55$, $0 \leq z \leq 0.4$, $0 < a \leq 0.1$, $0 \leq b \leq 0.1$, and M is one or more elements selected from the group consisting of Mg, Ca, Al, Ti, V, Cr, Zr, Nb, Mo, Hf, and Ta), which includes a first crystallization process of supplying a first raw material aqueous solution containing the metal elements and an ammonium ion supplier into a reaction tank, adjusting a pH of a reaction aqueous solution in the reaction tank, and performing a crystallization reaction and a second crystallization process of supplying a second raw material aqueous solution containing the metal elements and a more amount of tungsten than the first raw material aqueous solution and an ammonium ion supplier into the reaction tank, adjusting a pH of the reaction aqueous solution, and performing a crystallization reaction to form a tungsten-concentrated layer and in which the first crystallization process and the second crystallization process are performed one or more times in this order, the first crystallization process of the first time includes a nuclear generation process of performing nuclear generation and a particle growth process of performing particle growth and the second crystallization process includes performing particle growth subsequently to the particle growth process, switching of reaction atmosphere from either atmosphere of a non-oxidizing atmosphere having an oxygen concentration of 5 vol % or less or an oxidizing atmosphere having an oxygen concentration higher than the oxygen concentration in the non-oxidizing atmosphere to the other atmosphere is performed two or more times in particle growth in the first and second crystallization processes, and a time for supplying the second raw material aqueous solution into the reaction tank in the non-oxidizing atmosphere is 50% or more with respect to an entire time for supplying the second raw material aqueous solution into the reaction tank.

It is preferable that nuclear generation in the first crystallization process is performed in the non-oxidizing atmosphere and a pH of the reaction aqueous solution is adjusted to be lower than a pH value of the reaction aqueous solution in the nuclear generation process and switching of atmosphere from the non-oxidizing atmosphere to the oxidizing atmosphere is performed two or more times in particle growth in the first and second crystallization processes. It is preferable that switching of reaction atmosphere from the non-oxidizing atmosphere to the oxidizing atmosphere is performed four times. It is preferable that the metal composite hydroxide includes secondary particles with a plurality of aggregated primary particles, the secondary particles have a multilayer structure including a center at which the primary particles are densely disposed, a void at which the primary particles are more sparsely disposed than the center, and a solid portion at which the primary particles are densely disposed from a center of the secondary particles toward a surface, and a tap density of the metal composite hydroxide is 0.75 g/cm³ or more and 1.35 g/cm³ or less. It is preferable that the second crystallization process includes forming the tungsten-concentrated layer so as to have a thickness of 100 nm or less in a direction from a surface of the metal composite hydroxide toward a center. It is preferable that addition of the second raw material aqueous solution in the second crystallization process is performed at a time point at which 30% or more and 95% or less of entire time during which particle growth is performed has elapsed in the first and second crystallization processes. It is preferable that the second raw material aqueous solution includes the first raw material aqueous solution and an aqueous solution containing tungsten and supply of the second raw material aqueous solution is performed by separately supplying the first raw material aqueous solution and an aqueous solution containing tungsten to the reaction aqueous solution. It is preferable that a tungsten concentration in the aqueous solution containing tungsten is 18 mass % or more with respect to a total amount of the aqueous solution containing tungsten. It is preferable that a content of tungsten contained in the metal composite hydroxide is 70 mol % or more with respect to an amount of tungsten supplied into the reaction tank.

In a second embodiment of the present invention, there is provided a metal composite hydroxide that contains nickel, manganese, and tungsten and optionally cobalt and element M and has a mass ratio of the respective metal elements represented by $Ni:Mn:Co:W:M=x:y:z:a:b$ ($x+y+z=1$, $0.3 \leq x \leq 0.95$, $0.05 \leq y \leq 0.55$, $0 \leq z \leq 0.4$, $0 < a \leq 0.1$, $0 \leq b \leq 0.1$, and M is one or more elements selected from the group consisting of Mg, Ca, Al, Ti, V, Cr, Zr, Nb, Mo, Hf, and Ta), which includes secondary particles with a plurality of aggregated primary particles and in which a tungsten-concentrated layer is provided on a surface layer of the secondary particles, the secondary particles have a multilayer structure including a center at which the primary particles are densely disposed, a void at which the primary particles are more sparsely disposed than the center, and a solid portion at which the primary particles are densely disposed from a center of the secondary particles toward a surface, a tap density is 0.75 g/cm³ or more and 1.35 g/cm³ or less, and tungsten is contained in a dense solid portion at a higher concentration than in the void.

It is preferable that a thickness of the tungsten-concentrated layer is 100 nm or less. It is preferable that an average particle size of the metal composite hydroxide is 4.0 μm or more and 9.0 μm or less and [(d90−d10)/average particle size] that is an index indicating spread of particle size distribution is 0.65 or less.

In a third embodiment of the present invention, there is provided a method for producing a positive electrode active material for lithium ion secondary battery, which includes a process of mixing a lithium compound with at least either of a metal composite hydroxide obtained by the production method described above or a metal composite oxide obtained by subjecting the metal composite hydroxide to a heat treatment to obtain a lithium mixture and a process of firing the lithium mixture to obtain a lithium-metal composite oxide.

In a fourth embodiment of the present invention, there is provided a positive electrode active material for non-aqueous electrolyte secondary battery, which includes a lithium-metal composite oxide that contains lithium, nickel, manganese, and tungsten and optionally cobalt and element M and has a mass ratio of the respective metal elements represented by $Li:Ni:Mn:Co:W:M=1+u:x:y:z:a:b$ ($x+y+z=1$, $−0.05 \leq u \leq 0.50$, $0.3 \leq x \leq 0.95$, $0.05 \leq y \leq 0.55$, $0 \leq z \leq 0.4$, $0 < a \leq 0.1$, $0 \leq b \leq 0.1$, and M is one or more elements selected from the group consisting of Mg, Ca, Al, Ti, V, Cr, Zr, Nb, Mo, Hf, and Ta) and in which the lithium-metal composite oxide includes secondary particles with a plurality of aggregated primary particles, the secondary particles have a multilayer structure including at least a center at which the primary particles are densely disposed, a void at which the primary particles are more sparsely disposed than the center, and a solid portion at which the primary particles are densely disposed from a center of the secondary particles toward a surface, a compound containing tungsten and lithium is present in a concentrated state on a surface layer of primary particles present on a surface of or inside the secondary particles and at a grain boundary between the primary particles, a tap density is 1 g/cm³ or more and 2 g/cm³ or less, and a BET specific surface area is 1.45 m²/g or more and 5.4 m²/g or less.

In the positive electrode active material, it is preferable that a crystallite diameter of (003) plane obtained by powder X-ray diffraction measurement is 110 nm or more.

In a fifth embodiment of the present invention, there is provided a lithium ion secondary battery which includes a positive electrode; a negative electrode; a separator; and a non-aqueous electrolyte and in which the positive electrode active material for lithium ion secondary battery described above is used as a positive electrode material of the positive electrode.

Advantageous Effects of Invention

According to the present invention, it is possible to provide a positive electrode active material having decreased reaction resistance, a high output, and high crystallinity when being used in a positive electrode of a secondary battery, a metal composite hydroxide that is a precursor of the positive electrode active material, and a method for producing the metal composite hydroxide. The method for producing a metal composite hydroxide of the present invention can provide a method for producing a metal composite hydroxide having an improved yield of tungsten. According to the present invention, it is possible to provide a secondary battery containing such a positive electrode active material. According to the present invention, it is possible to provide a method capable of easily producing such positive electrode active material and metal composite hydroxide on an industrial scale. For this reason, the industrial significance of the present invention is extremely great.

DESCRIPTION OF EMBODIMENTS

Figure 1:
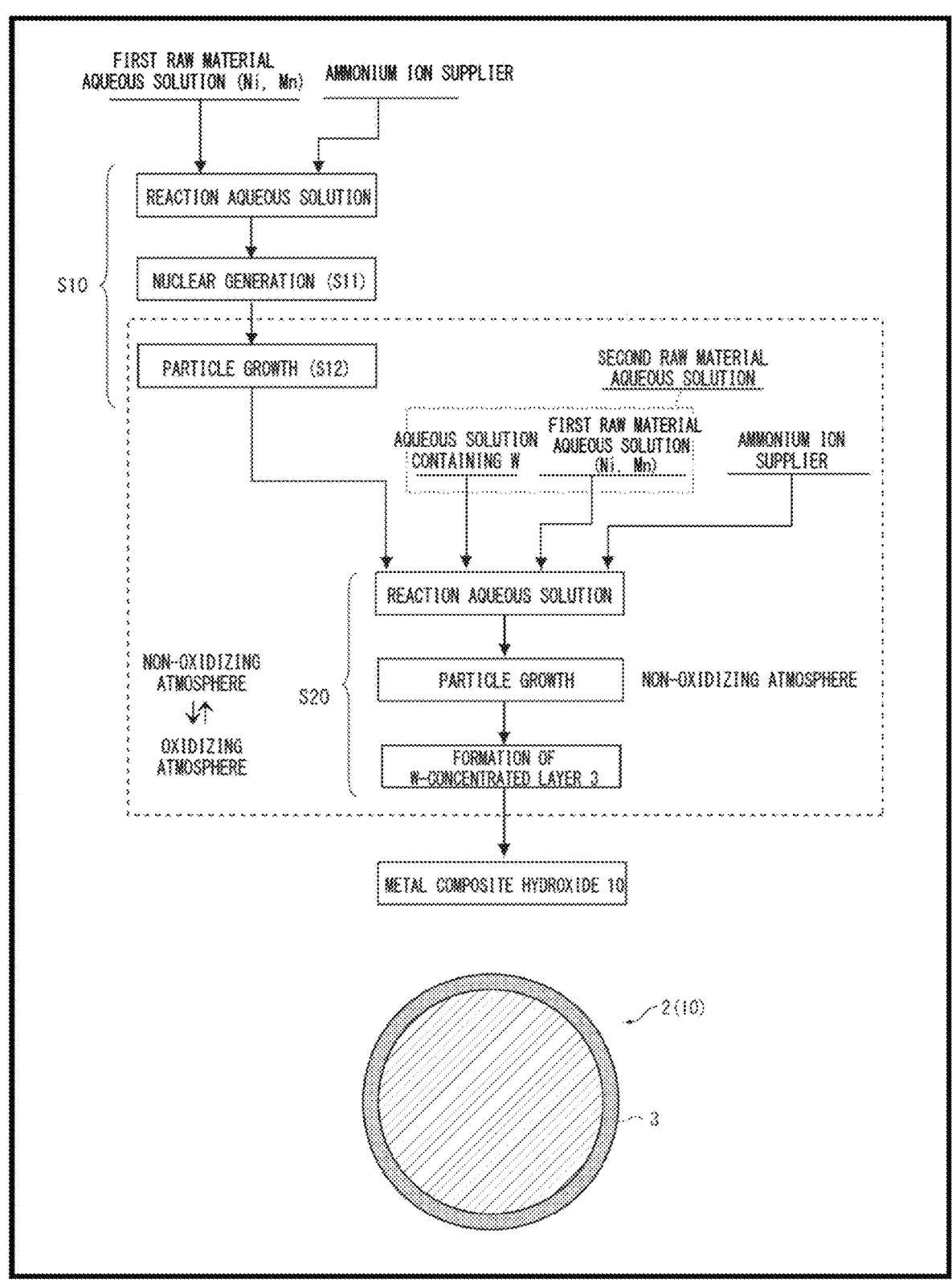
FIG. 1 is a diagram illustrating an example of a method for producing a metal composite hydroxide.

Hereinafter, a metal composite hydroxide and a method for producing the same, a positive electrode active material for lithium ion secondary battery and a method for producing the same, and a lithium ion secondary battery according to embodiments will be described with reference to the drawings. It should be noted that the present invention is not limited to the embodiments to be described below. In the drawings, some parts are emphasized or some parts are simplified, and actual structures, shapes, scales, and the like may be different in order to facilitate understanding of each configuration.

1. Method for Producing Metal Composite Hydroxide

Figure 2:
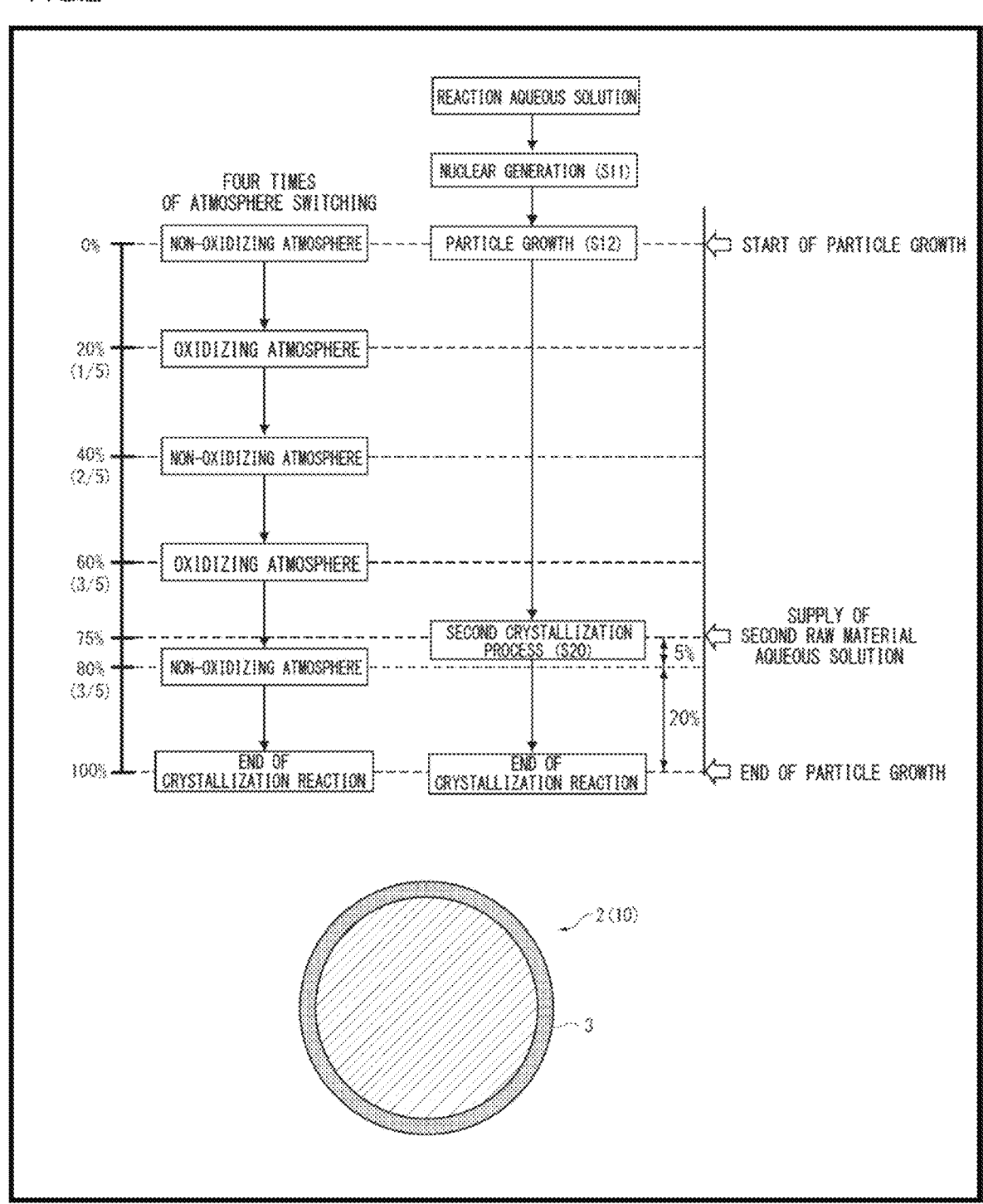
FIG. 2 is a diagram illustrating an example of a method for producing a metal composite hydroxide.
Figure 3:
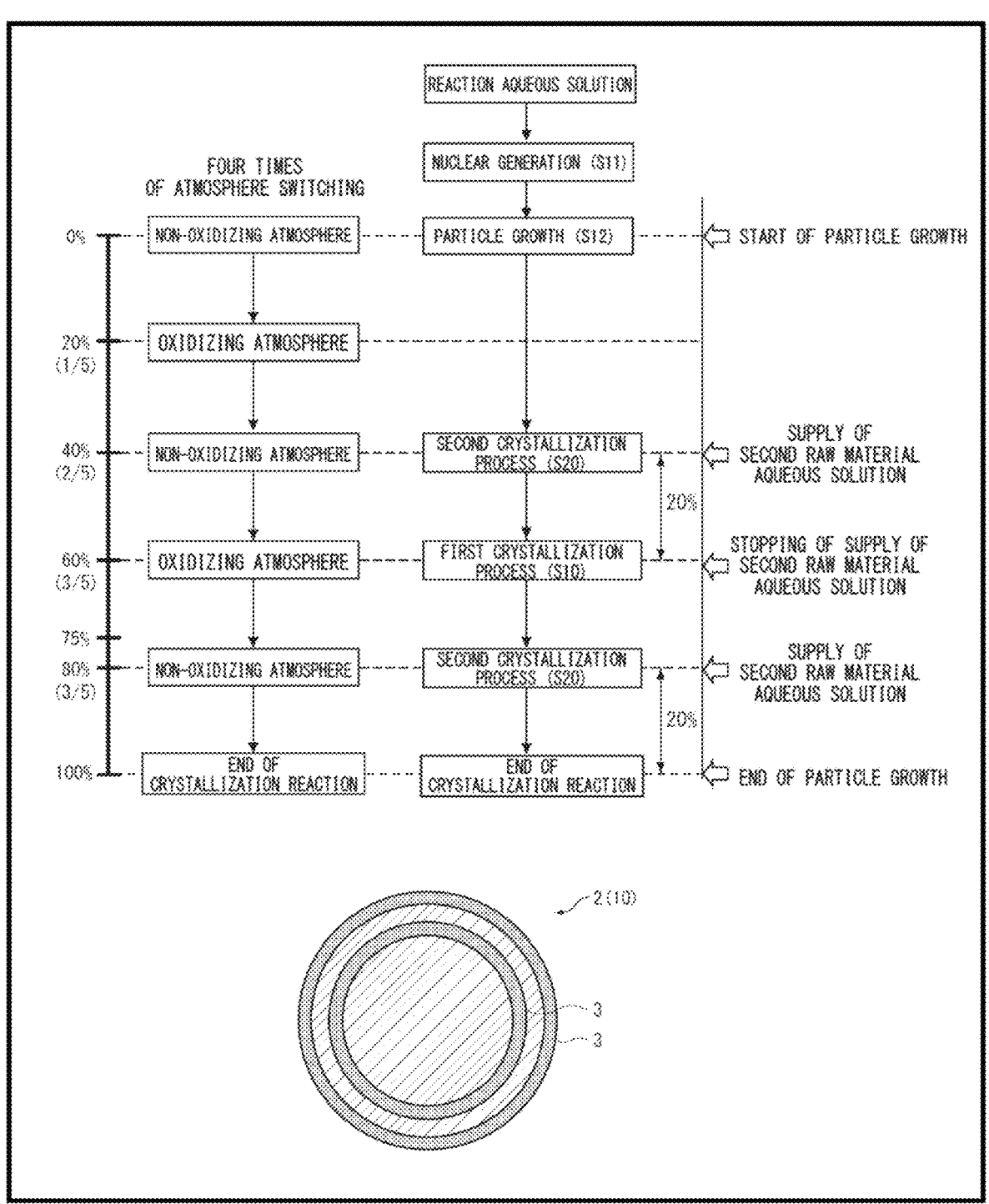
FIG. 3 is a diagram illustrating an example of a method for producing a metal composite hydroxide.

The production method according to the present embodiment is a method for producing a metal composite hydroxide that contains nickel, manganese, and tungsten and optionally cobalt and element M and has a mass ratio (molar ratio) of the respective metal elements represented by Ni:Mn:Co:W:M=x:y:z:a:b (x+y+z=1, 0.3≤x<0.95, 0.05≤y≤0.55, 0≤z≤0.4, 0<a≤0.1, 0≤b≤0.1, and M is one or more elements selected from the group consisting of Mg, Ca, Al, Ti, V, Cr, Zr, Nb, Mo, Hf, and Ta). FIGS. 1 to 3 are diagrams illustrating an example of the method for producing a metal composite hydroxide according to the present embodiment.

As illustrated in FIGS. 1 to 3, a metal composite hydroxide 10 (secondary particles 2) obtained by the production method according to the present embodiment has a tungsten-concentrated layer 3 in which tungsten is concentrated on the surface layer (surface side) thereof. The metal composite hydroxide 10 includes secondary particles 2 with a plurality of aggregated primary particles 1 (see FIG. 4(C)). By the presence of the tungsten-concentrated layer 3 in the metal composite hydroxide 10, a secondary battery having significantly decreased reaction resistance (positive electrode resistance) can be obtained when the metal composite hydroxide 10 is used in the positive electrode of a secondary battery. By the production method according to the present embodiment, such a metal composite hydroxide 10 can be easily produced on an industrial scale.

As will be described later, in the production method according to the present embodiment, it is possible to efficiently deposit the amount of tungsten added (the amount supplied) inside the secondary particles 2 (metal composite hydroxide 10) by adding a more amount of tungsten in a non-oxidizing atmosphere in the second crystallization process (step S20), the yield of tungsten is greatly improved, and this production method is more suitable for industrial scale production. The first crystallization process (step S10) and the second crystallization process (step S20) may be performed in this order only one time or may be repeatedly performed in this order two or more times. Hereinafter, the respective processes will be described.

[Crystallization Reaction]

As illustrated in FIG. 1, the method for producing the metal composite hydroxide 10 includes a first crystallization process (step S10) of supplying a first raw material aqueous solution containing nickel (Ni) and manganese (Mn) and optionally cobalt (Co) and/or metal element (M) and an ammonium ion supplier into a reaction tank, adjusting the pH of the reaction aqueous solution in the reaction tank, and performing a crystallization reaction and a second crystallization process (step S20) of supplying a second raw material aqueous solution containing nickel (Ni) and manganese (Mn) and optionally cobalt (Co) and/or metal element (M) and a more amount of tungsten than the first raw material aqueous solution and an ammonium ion supplier into the reaction tank, adjusting the pH of the reaction aqueous solution, and performing a crystallization reaction to form a tungsten-concentrated layer.

The particles (hereinafter, also referred to as "first metal composite hydroxide particles") obtained in the first crystallization process (step S10) are composed of primary particles that do not contain tungsten or have a low tungsten content. Hence, a lithium-metal composite oxide 20 (see FIG. 5(A) and FIG. 5(B)) obtained using the metal composite hydroxide 10 having a site derived from the first metal composite hydroxide particles as a precursor can exhibit high crystallinity. The lithium-metal composite oxide 20 exhibits excellent output characteristics as a compound 23 containing tungsten derived from the tungsten-concentrated layer 3 formed in the second crystallization process (step S20) and lithium is present on the surface of primary particles 21 in the lithium-metal composite oxide 20 or at the grain boundaries between the primary particles 21.

It is preferable that the first crystallization process (step S10) further includes a nuclear generation process (step S11) of mainly performing nuclear generation and a particle growth process (step S12) of mainly performing particle growth as illustrated in FIG. 1. The nuclear generation process (step S11) and the particle growth process (step S12) can be clearly separated from each other, for example, by controlling the pH of the reaction aqueous solution, and the metal composite hydroxide 10 having narrow particle size distribution and a uniform particle size can be obtained. The second crystallization process (step S20) is a process of mainly performing particle growth subsequently to the particle growth process (step S12).

The method for producing nickel composite hydroxide including such a two-stage crystallization process is disclosed in, for example, Patent Literatures 2 and 3 and the like, and the detailed conditions can be appropriately adjusted with reference to these literatures. The method for producing a metal composite hydroxide according to the present embodiment can be easily applied to industrial scale production since the tungsten-concentrated layer 3 having a desired film thickness can be formed under the conditions of a known crystallization method as will be described later.

Hereinafter, an example of the production method including the nuclear generation process (step S11) and the particle growth process (step S12) will be described with reference to FIG. 1. It should be noted that the following description is an example of the method for producing the metal composite hydroxide 10 and the method is not limited to this method.

(1) First Crystallization Process (Step S10)
(Nuclear Generation Process)

First, the first raw material aqueous solution and the ammonium ion supplier are supplied, the pH of the reaction aqueous solution (aqueous solution for nuclear generation) in the reaction tank is controlled in a predetermined range, and nuclear generation is performed (step S11). The first raw material aqueous solution is prepared by, for example, dissolving a compound containing a transition metal to be a raw material in water. In the method for producing a metal composite hydroxide to be described below, the composition ratio in the metal composite hydroxide formed by crystallization in each process is the same as the composition ratio of the respective metals in the raw material aqueous solution, and thus the composition ratio of the respective metals in the raw material aqueous solution can be adopted as the composition ratio of the transition metals in the intended metal composite hydroxide. The first raw material aqueous solution may contain tungsten in a small amount or may not contain tungsten.

First, an alkaline aqueous solution and an aqueous solution containing an ammonium ion supplier are supplied into and mixed together in a reaction tank to prepare a pre-reaction aqueous solution having a pH value of 12.0 or more and 14.0 or less as measured at a liquid temperature of 25° C. and an ammonium ion concentration of 3 g/L or more and 25 g/L or less.

The reaction atmosphere in the reaction tank can be appropriately adjusted depending on the structure of the intended secondary particles 2. When the center of the secondary particles 2 has a solid structure (when the primary particles 1 are densely disposed), it is preferable to set the reaction atmosphere to a non-oxidizing atmosphere. On the other hand, when the center of the secondary particles 2 has a hollow structure (when the primary particles 1 are sparsely disposed), it is preferable to set the reaction atmosphere to an oxidizing atmosphere. The atmosphere is adjusted by introducing, for example, nitrogen gas. The pH value of the pre-reaction aqueous solution can be measured using a pH meter and the ammonium ion concentration can be measured using an ion meter.

Subsequently, a reaction aqueous solution (aqueous solution for nuclear generation) is formed by supplying the first raw material aqueous solution into the reaction tank while stirring the pre-reaction aqueous solution in the reaction tank. In the nuclear generation process (step S11), the pH value of and the concentration of ammonium ions in the aqueous solution for nuclear generation change as the nuclear generation proceeds in the reaction aqueous solution, and it is thus preferable to control so that the pH value of the liquid in the reaction tank is maintained in the range of pH 12.0 or more and 14.0 or less at a liquid temperature of 25° C. and the concentration of ammonium ions is maintained in the range of 3 g/L or more and 25 g/L or less by supplying an alkaline aqueous solution and an ammonia aqueous solution in a timely manner. When the pH value of the reaction aqueous solution (aqueous solution for nuclear generation) is in the above range, the nucleus hardly grows but nuclear generation preferentially occurs.

The pH value of the reaction aqueous solution (aqueous solution for nuclear generation) measured at a liquid temperature of 25° C. is preferably in a range of 12.0 or more and 14.0 or less, more preferably 12.3 or more and 13.5 or less, still more preferably 12.5 or more and 13.3 or less. When the pH is in the above range, it is possible to suppress the growth of nuclei, to preferentially perform nuclear generation, to generate homogeneous nuclei having narrow particle size distribution in the nuclear generation process. On the other hand, when the pH value is less than 12.0, the growth of nuclei (particles) proceeds together with nuclear generation, thus the particle sizes of the metal composite hydroxides obtained are non-uniform, and the particle size distribution deteriorates. When the pH value exceeds 14.0, the generated nuclei are too fine and the reaction aqueous solution (aqueous solution for nuclear generation) gels in some cases.

The fluctuation range of the pH value in the reaction aqueous solution (aqueous solution for nuclear generation) is preferably set to be within ±0.2. When the fluctuation range of the pH value is large, the amount of nuclei generated and the proportion of particle growth are not constant and it is difficult to obtain a metal composite hydroxide having narrow particle size distribution.

The ammonium ion concentration in the reaction aqueous solution (aqueous solution for nuclear generation) is adjusted to be within a range of preferably 3 g/L or more and 25 g/L or less and more preferably 5 g/L or more and 20 g/L or less. Ammonium ions function as a complexing agent in the reaction aqueous solution, and it is thus difficult to obtain a metal composite hydroxide having well-ordered shape and particle size when the ammonium ion concentration is less than 3 g/L since the solubility of metal ions cannot be kept constant or the reaction aqueous solution easily gels. On the other hand, when the ammonium ion concentration exceeds 25 g/L, the solubility of metal ions is too high, thus the metal ion content remaining in the reaction aqueous solution increases, and this may cause deviation of composition and the like.

When the ammonium ion concentration fluctuates during the crystallization reaction, the solubility of metal ions fluctuates and uniform metal composite hydroxides are not formed. For this reason, it is preferable to control the fluctuation range of ammonium ion concentration in a certain range throughout the nuclear generation process (step S11) and the particle growth process (step S12). Specifically, the fluctuation range is preferably controlled to be in a range of ±5 g/L.

In the nuclear generation process (step S11), a new nucleus is continuously generated as the first raw material aqueous solution, an alkaline aqueous solution, and an aqueous solution containing an ammonium ion supplier are supplied to the reaction aqueous solution (aqueous solution for nuclear generation). The nuclear generation process (step S11) is terminated at a time point at which a predetermined amount of nuclei is generated in the aqueous solution for nuclear generation. At this time, the amount of nuclei generated can be determined from the amount of the metal compound contained in the raw material aqueous solution supplied to the aqueous solution for nuclear generation.

The amount of nuclei generated in the nuclear generation process (step S11) is not particularly limited but is preferably 0.1 at % or more and 2 at % or less and more preferably 0.1 at % or more and 1.5 at % or less with respect to the amount of metal element in the metal compound contained in the raw material aqueous solution supplied throughout the crystallization process (including the first crystallization process and the second crystallization process) from the viewpoint of obtaining a metal composite hydroxide having narrow particle size distribution.

In the nuclear generation process, the upper limit of the temperature of the reaction aqueous solution (aqueous solution for nuclear generation) is not particularly limited but is, for example, preferably 60° C. or less, more preferably 50° C. or less. This is because it is concerned that the primary crystals are distorted and the tap density begins to decrease when the temperature of the reaction aqueous solution (aqueous solution for nuclear generation) exceeds 60° C.

(Particle Growth Process)

Subsequently, particle growth is performed in the reaction aqueous solution (aqueous solution for particle growth) of which the pH is adjusted to be in a specific range (step S12). The reaction aqueous solution (aqueous solution for particle growth) is prepared by supplying the first raw material aqueous solution, an alkaline aqueous solution, and an aqueous solution containing an ammonium ion supplier to the reaction aqueous solution containing the nuclei generated. In the reaction aqueous solution (aqueous solution for particle growth), it is preferable to adjust the pH value to 10.5 or more and 12.0 or less as measured at a liquid temperature of 25° C. and the ammonium ion concentration to 3 g/L or more and 25 g/L or less. By this, not nuclear generation but particle growth is dominantly performed in the reaction aqueous solution (aqueous solution for particle growth).

With regard to the reaction atmosphere in the reaction tank, it is preferable to appropriately switch the reaction atmosphere from a non-oxidizing atmosphere having an oxygen concentration of 5 vol % or less to an oxidizing atmosphere having an oxygen concentration higher than that in the non-oxidizing atmosphere and from an oxidizing atmosphere to a non-oxidizing atmosphere in the case of obtaining the metal composite hydroxide 10 mainly including the secondary particles 2 having a multilayer structure in which the sparseness of the primary particles 1 is adjusted. The atmosphere is adjusted by introducing, for example, nitrogen gas.

For example, after termination of the nuclear generation process (step S11), the pH value of the aqueous solution for nuclear generation in the reaction tank is adjusted to 10.5 or more and 12.0 or less at a liquid temperature of 25° C., and an aqueous solution for particle growth, which is a reaction aqueous solution in the particle growth process, is prepared. The pH value can be adjusted by stopping the supply of only the alkaline aqueous solution, but it is preferable to temporarily stop the supply of all the aqueous solutions and thus to adjust the pH value from the viewpoint of enhancing the uniformity of particle size. The pH value may be adjusted by supplying the same kind of inorganic acid as the acid constituting the compound containing a transition metal to be a raw material, for example, sulfuric acid in the case of using a sulfate of a transition metal as a raw material to the reaction aqueous solution (aqueous solution for nuclear generation).

Next, supply of the first raw material aqueous solution is restarted while stirring the reaction aqueous solution (aqueous solution for particle growth). At this time, the pH value of the aqueous solution for particle growth is in the above-described range, thus new nuclei are hardly generated, but nucleus (particle) growth proceeds, and first metal composite hydroxide particles having a predetermined particle size can be formed. In the particle growth process (step S12) as well, the pH value of and the ammonium ion concentration in the aqueous solution for particle growth change as the particle growth proceeds, and it is thus required to maintain the pH value and ammonium ion concentration in the above ranges by supplying an alkaline aqueous solution and an ammonia aqueous solution in a timely manner.

The pH value of the reaction aqueous solution (aqueous solution for particle growth) is controlled in a range of 10.5 or more and 12.0 or less, preferably 11.0 or more and 12.0 or less, more preferably 11.5 or more and 11.9 or less at a liquid temperature of 25° C. When the pH is in the above range, it is possible to suppress the generation of new nuclei, to preferentially perform particle growth, and to obtain a homogeneous metal composite hydroxide having narrow particle size distribution. On the other hand, when the pH value is less than 10.5, the ammonium ion concentration increases and the solubility of metal ions increases, thus not only the rate of crystallization reaction slows down but also the metal ion content remaining in the reaction aqueous solution increases and the productivity may deteriorate. When the pH value exceeds 12.0, the amount of nuclei generated during the particle growth process increases, the particle sizes of the metal composite hydroxide particles obtained are non-uniform, and the particle size distribution may deteriorate.

The fluctuation range of the pH value in the reaction aqueous solution (particle growth aqueous solution) is preferably set to be within ±0.2. When the fluctuation range of the pH value is large, the amount of nuclei generated and the proportion of particle growth are not constant and it is difficult to obtain a metal composite hydroxide having narrow particle size distribution.

The pH value in the particle growth process (step S12) is preferably adjusted to a value lower than the pH value in the nuclear generation process (step S11), and the pH value in the particle growth process (step S12) is set to be lower than the pH value in the nuclear generation process (step S11) by preferably 0.5 or more and more preferably 0.8 or more in order to clearly separate nuclear generation and particle growth from each other.

For example, when the pH value of the reaction aqueous solution (nuclear generation process and/or particle growth process) is 12.0, the pH value is a boundary condition between nuclear generation and particle growth and thus the condition can be the condition for either of the nuclear generation process or the particle growth process depending on the presence or absence of nuclei in the reaction aqueous solution. In other words, when the pH value in the nuclear generation process is set to be higher than 12.0, a large amount of nuclei are generated, and then the pH value in the particle growth process is set to 12.0, a large amount of nuclei are present in the reaction aqueous solution, thus particle growth preferentially occurs, and metal composite hydroxide particles having narrow particle size distribution can be obtained. On the other hand, when the pH value in the nuclear generation process is set to 12.0, there is no nucleus that grows in the reaction aqueous solution, thus nuclear generation preferentially occurs, and the generated nuclei grow and favorable metal composite hydroxide particles can be obtained by setting the pH value in the particle growth process to be lower than 12.0.

The ammonium ion concentration in the reaction aqueous solution (aqueous solution for particle growth) can be set to be the same as the preferable range of the ammonium ion concentration in the reaction aqueous solution (aqueous solution for nuclear generation). The fluctuation range of the ammonium ion concentration can also be set to be the same as the preferable range in the reaction aqueous solution (aqueous solution for nuclear generation).

The reaction atmosphere in the particle growth process (step S12) and the second crystallization process (step S20) to be described later may be appropriately switched by adjusting the oxygen concentration, or the reaction atmosphere may be switched from either atmosphere of a non-oxidizing atmosphere having an oxygen concentration of 5 vol % or less or an oxidizing atmosphere having an oxygen concentration higher than that in the non-oxidizing atmosphere to the other atmosphere two or more times. By switching the reaction atmosphere, the sparseness of the primary particles 1 in the secondary particles 2 obtained can be controlled within a desired range. For example, the switching of the reaction atmosphere in the particle growth process (step S12) and the second crystallization process (step S20) may be performed two times, three times, or four or more times. By switching the reaction atmosphere, it is possible to obtain the secondary particles 2 in which the sparseness of the primary particles 1 is controlled.

Figure 4A:
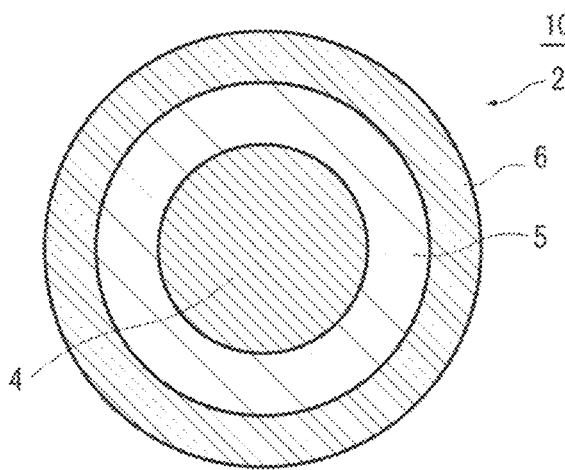
FIG. 4(A) and FIG. 4(B) are schematic diagrams illustrating an example of a metal composite hydroxide.

For example, when the center of the secondary particles has a solid structure, the particle growth may be performed in a non-oxidizing atmosphere in the nuclear generation process (step S11), then the particle growth may be performed by switching the reaction atmosphere to an oxidizing atmosphere (first switching), and the particle growth may be performed by further switching the reaction atmosphere to a non-oxidizing atmosphere (second switching) (see FIG. 4(A)). As will be described later, the reaction atmosphere may be further switched to an oxidizing atmosphere (third switching) and then the reaction atmosphere may be switched to a non-oxidizing atmosphere (fourth switching).

(2) Second Crystallization Process

Subsequently, a second raw material aqueous solution containing metal elements and a more amount of tungsten than the first raw material aqueous solution and an ammonium ion supplier are supplied to the reaction aqueous solution containing the first metal composite hydroxide particles, and a crystallization reaction is performed to form the tungsten-concentrated layer 3 (step S20).

Particles grow taking the secondary particles 2 with a plurality of aggregated primary particles 1 as a nucleus. Hence, in the second crystallization process (step S20), the second crystallization process (step S20) can be performed by supplying the second raw material aqueous solution containing a more amount of tungsten than the first raw material aqueous solution and the ammonium ion supplier to the reaction aqueous solution containing subsequently to the particle growth process (step S12). By this, the tungsten-concentrated layer 3 is formed on the outer periphery part of the particles obtained in the first crystallization process (step S10).

In the method for producing a metal composite hydroxide of the present embodiment, the thickness, characteristics and the like of the tungsten-concentrated layer 3 formed on the outer periphery of the particles obtained in the first crystallization process (step S10) can be easily controlled, for example, by adjusting the timing (namely, the timing to start the second crystallization process) to start addition of the second raw material aqueous solution.

The present inventors have found out that the yield of tungsten is significantly improved by supplying a second raw material aqueous solution containing a large amount of tungsten to the reaction aqueous solution in a non-oxidizing atmosphere in the second crystallization process (step S20). For example, by supplying a more amount of second raw material aqueous solution to the reaction aqueous solution in a non-oxidizing atmosphere, it is possible to efficiently deposit the amount of tungsten added (the amount supplied) inside the secondary particles 2 of the metal composite hydroxide 10, the yield of tungsten is greatly improved, and the productivity can be improved.

For example, from the viewpoint of further improving the yield of tungsten, the time for supplying the second raw material aqueous solution into the reaction tank in a non-oxidizing atmosphere is preferably 50% or more, more preferably 70% or more, more preferably 90% or more, still more preferably 100% with respect to the entire time for supplying the second raw material aqueous solution in the second crystallization process (step S20).

In the production method according to the present embodiment, the content of tungsten (yield of tungsten) contained in the finally obtained metal composite hydroxide 10 is preferably 70 mol % or more, more preferably 80 mol % or more, more preferably 90 mol % or more, still more preferably 100 mol % with respect to the amount of tungsten supplied (the amount added) into the reaction tank.

The second crystallization reaction (step S20) can be started by supplying the second raw material aqueous solution at the time point at which the metal elements in the first raw material aqueous solution are supplied into the reaction tank at, for example, 10 mass % or more with respect to the total amount of metals added in the first crystallization process and second crystallization process. By this, a tungsten-concentrated layer can be easily formed on the surface of the first metal composite hydroxide particles.

From the viewpoint of obtaining a positive electrode active material which exhibits higher crystallinity and further decreases the reaction resistance when being used in the positive electrode of a secondary battery, the second crystallization process (step S20) can be started by supplying the second raw material aqueous solution at the time point at which the metal elements in the first raw material aqueous solution are supplied into the reaction tank preferably in a range of 30 mass % or more and 95 mass % or less with respect to the total amount of metals added in the first crystallization process and second crystallization process.

The second crystallization process (step S20) is a process in which particle growth is performed in the same manner as the particle growth process (step S12), and thus the pH, temperature, and ammonium ion concentration in the reaction aqueous solution, the atmosphere in the reaction tank, and the like can be set to the same conditions as those in the particle growth process (step S12). By subsequently performing the second crystallization process (step S20) under the same conditions as those in the particle growth process (step S12), a tungsten-concentrated layer can be formed on the surface of the first metal composite hydroxide particles simply and with high productivity.

The supply of the second raw material aqueous solution may be performed by separately preparing a raw material aqueous solution containing metal elements other than tungsten and an aqueous solution containing tungsten and supplying each of these into the reaction tank. A tungsten-concentrated layer can be formed more easily and uniformly by separately supplying the aqueous solution containing tungsten. As illustrated in FIG. 1, the second raw material aqueous solution may include the first raw material aqueous solution and an aqueous solution containing tungsten (W) and the respective aqueous solutions may be separately supplied to reaction aqueous solution. By this, it is possible to uniformly form the tungsten-concentrated layer and to easily adjust the thickness of the tungsten-concentrated layer by changing the concentration of the aqueous solution containing tungsten and the flow velocity when the aqueous solution containing tungsten is supplied into the reaction tank.

The aqueous solution containing tungsten can be prepared by, for example, dissolving a tungsten compound in water. The tungsten compound used is not particularly limited, and a compound which contains tungsten but does not contain lithium can be used, but sodium tungstate can be preferably used.

The tungsten (W) concentration in the aqueous solution containing tungsten is not particularly limited but is, for example, 0.1 mol/L or more and 0.5 mol/L or less, preferably 0.2 mol/L or more and 0.4 mol/L or less. The flow rate of the aqueous solution containing tungsten added is not particularly limited but is, for example, 5 L/min or more and 20 L/min or less, preferably 10 L/min or more and 15 L/min or less.

The thickness of the tungsten-concentrated layer can also be controlled by adjusting the concentration of the aqueous solution containing tungsten or the flow rate of the aqueous solution added. For example, when the concentration and added flow rate of the aqueous solution containing tungsten are constant, the thickness and concentration of the tungsten-concentrated layer to be formed can be adjusted more accurately and easily by adjusting the time point at which addition of the aqueous solution containing tungsten starts.

FIGS. 2 and 3 are diagrams illustrating a suitable example of the production method of the present embodiment. Hereinafter, an example of the timing to switch the reaction atmosphere when the first crystallization process (step S10) separately includes the nuclear generation process (step S11) and the particle growth process (step S12) and the second crystallization process (step S20) is performed by supplying the second raw material aqueous solution subsequently to the particle growth process (step S12) will be described with reference to FIGS. 2 and 3.

Figure 4B:
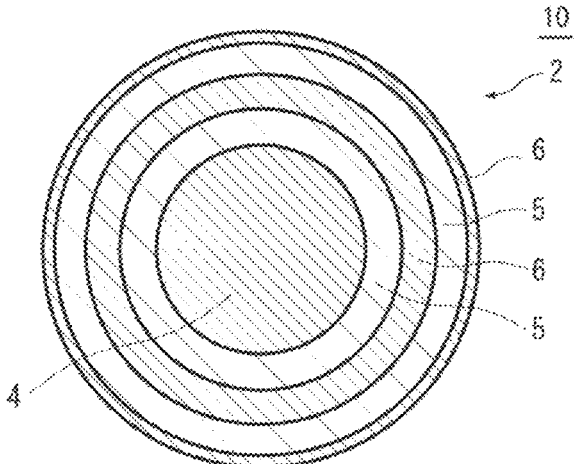

FIG. 2 is a diagram illustrating an example when the reaction atmosphere is switched four times in the particle growth of the first crystallization process (step S10) and second crystallization process (step S20). By switching the reaction atmosphere four times in this manner, it is possible to obtain secondary particles 2 (metal composite hydroxide 10) having a multilayer structure including a center 4 at which the primary particles 1 are densely disposed and two layers alternately composed of a void 5 at which the primary particles 1 are more sparsely disposed than at the center 4 and a solid portion 6 at which the primary particles 1 are densely disposed from the center of the secondary particles 2 toward the surface, for example, as illustrated in FIG. 4(B). The positive electrode active material obtained using the secondary particles 2 (metal composite hydroxide 10) having such a porous structure has a high specific surface area and thus can further decrease the reaction resistance (positive electrode resistance) when being used in the positive electrode of a secondary battery.

In FIG. 2, the second raw material aqueous solution is supplied from the time point at which 75% of the entire time, during which particle growth is performed from the start point of particle growth process (step S12) to the end point of particle growth (end point of crystallization process) has elapsed to the time point at which the particle growth ends. In this case, the tungsten-concentrated layer 3 is formed as a single layer on the surface layer (outer periphery) of the secondary particles 2 (metal composite hydroxide 10) as illustrated in the lower part of FIG. 2. The tungsten-concentrated layer 3 is not formed when the aqueous solution of a tungsten compound is added in the whole process from the start point to the end point of particle growth.

In FIG. 2, the time for supplying the second raw material aqueous solution in a non-oxidizing atmosphere is 20% with respect to the entire time during which particle growth is performed and the time for supplying the second raw material aqueous solution in an oxidizing atmosphere is 5% with respect to the entire time during which particle growth is performed. Hence, the time for supplying the second raw material aqueous solution in a non-oxidizing atmosphere is 80% with respect to the entire time for supplying the second raw material aqueous solution.

When the time for supplying the second raw material aqueous solution in a non-oxidizing atmosphere is 50% or more with respect to the entire time for supplying the second raw material aqueous solution, the yield of tungsten in the metal composite hydroxide 10 is improved (see Example 4). As the time for supplying the second raw material aqueous solution in a non-oxidizing atmosphere is closer to 100%, the yield of tungsten is further improved.

The supply (second crystallization process:step S20) of the aqueous solution containing tungsten (second raw material aqueous solution) may be performed plural times. When supply of the aqueous solution containing tungsten (second raw material aqueous solution) is performed plural times, the tungsten-concentrated layer 3 can be further formed inside the secondary particles 2 in addition to the tungsten-concentrated layer 3 formed on the surface layer of the secondary particles 2 as illustrated in FIG. 3. For example, when at least one tungsten-concentrated layer 3 is formed inside the secondary particles 2 in addition to the surface layer of the secondary particles 2, the reaction resistance (positive electrode resistance) can be further decreased when the positive electrode active material obtained using the metal composite hydroxide 10 is used in a secondary battery.

FIG. 3 is a diagram illustrating another example when the atmosphere is switched four times in the particle growth of the first crystallization process (step S10) and second crystallization process (step S20) as in FIG. 2. In FIG. 3, the first crystallization process (step S10) and the second crystallization process (step S20) are performed plural times, and supply of the second raw material aqueous solution is performed two times from the time point at which 40% of the entire time, during which particle growth is performed, has elapsed to the time point at which 60% of the entire time has elapsed and from the time point at which 80% of the entire time has elapsed to the time point at which the particle growth ends (100%).

In FIG. 3, the time for supplying the second raw material aqueous solution in a non-oxidizing atmosphere is 40% with respect to the entire time during which particle growth is performed and the time for supplying the second raw material aqueous solution in an oxidizing atmosphere is 0% with respect to the entire time during which particle growth is performed. Hence, the time for supplying the second raw material aqueous solution in a non-oxidizing atmosphere in FIG. 3 is 100% with respect to the entire time for supplying the second raw material aqueous solution.

As illustrated in FIG. 3, when supply of the second raw material aqueous solution containing tungsten is performed plural times (for example, two times) only in a non-oxidizing atmosphere, the yield of tungsten is significantly favorable and the reaction resistance (positive electrode resistance) can be further decreased when the positive electrode active material obtained using the metal composite hydroxide 10 is used in a secondary battery (see Examples 1 and 2).

The supply of the second raw material aqueous solution is preferably continuously performed in the whole particle growth from the time point at which the reaction atmosphere is lastly switched to a non-oxidizing atmosphere to the time point at which the particle growth ends from the viewpoint of suitably forming the tungsten-concentrated layer 3 on the surface layer of the secondary particles 2.

The supply of the aqueous solution containing tungsten (second raw material aqueous solution) can be performed from the time point at which, for example, 10% or more, preferably 30% or more and 95% or less of the entire time from the start to the end of particle growth in the first and second crystallization processes has elapsed. The tungsten-concentrated layer 3 can be easily obtained with favorable productivity when the time at which the supply discloses is in the above range. There is a tendency that the crystallite diameter of the positive electrode active material obtained can be increased when the time point at which the addition of the aqueous solution containing tungsten discloses is later within the above range.

The lower limit of the time for supplying the second raw material aqueous solution may be 5% or more, 10% or more, 20% or more, or 30% or more with respect to the entire time from the start to the end of particle growth. The upper limit of the time for supplying the second raw material aqueous solution may be 90% or less, 80% or less, 60% or less, or 50% or less with respect to the entire time from the start to the end of particle growth.

Hereinafter, the respective raw materials and conditions preferably used in the crystallization process will be described.
(First and Second Raw Material Aqueous Solutions)

The first raw material aqueous solution and second raw material aqueous solution contain nickel and manganese and optionally cobalt, element M, and tungsten. The first raw material aqueous solution may not contain tungsten. In the second crystallization process, the ratio of the metal elements in the first raw material aqueous solution is the composition ratio (excluding tungsten) of the metal composite hydroxide finally obtained when the first raw material aqueous solution and an aqueous solution containing tungsten are used as the second raw material aqueous solution. For this reason, in the first raw material aqueous solution, the content of each metal element can be appropriately adjusted depending on the intended composition of metal composite hydroxide. For example, in the case of attempting to obtain metal composite hydroxide particles represented by the ratio (A) described above, the ratio of metal elements in the raw material aqueous solution can be adjusted to be Ni:Mn:Co: M=x:y:z:b (where x+y+z=1, $0.3 \leq x \leq 0.95$, $0.05 \leq y \leq 0.55$, $0 \leq z \leq 0.4$, and $0 \leq b \leq 0.1$). The compositions of the first raw material aqueous solution and second raw material aqueous solution used in the first crystallization process and second crystallization process may be different from each other. In this case, the sum of contents of the respective metal elements in the raw material aqueous solutions used in the respective crystallization processes can be the composition ratio in the metal composite hydroxide obtained.

The compounds of metal elements (transition metals) used in the preparation of the first raw material aqueous solution and second raw material aqueous solution are not particularly limited, but it is preferable to use water-soluble nitrates, sulfates, hydrochlorides and the like from the viewpoint of ease of handling, and it is particularly preferable to suitably use sulfates from the viewpoint of cost and of preventing halogen contamination.

In the case of containing element M (M is one or more elements selected from the group consisting of Mg, Ca, Al, Ti, V, Cr, Zr, Nb, Mo, Hf, Ta, and W) in the metal composite hydroxide, a water-soluble compound is preferable as a compound for supplying element M in the same manner, and for example, magnesium sulfate, calcium sulfate, aluminum sulfate, titanium sulfate, ammonium peroxotitanate, potassium titanium oxalate, vanadium sulfate, ammonium vanadate, chromium sulfate, potassium chromate, zirconium sulfate, niobium oxalate, ammonium molybdate, hafnium sulfate, sodium tantalate, sodium tungstate, and ammonium tungstate can be suitably used.

The concentrations of the first raw material aqueous solution and second raw material aqueous solution are set to preferably 1 mol/L or more and 2.6 mol/L or less, more preferably 1.5 mol/L or more and 2.2 mol/L or less as the sum of metal compounds. When the concentration of the raw material aqueous solution is less than 1 mol/L, the amount of crystallized substance per reaction tank decreases and thus the productivity decreases. On the other hand, when the concentration of the mixed aqueous solution exceeds 2.6 mol/L, the concentration exceeds the saturated concentration at room temperature and it is thus concerned that crystals of each metal compound are redeposited to clog the pipe and the like.

The above-described metal compound may not be necessarily supplied into the reaction tank as one kind of raw material aqueous solution. For example, in the case of performing the crystallization reaction using a metal compound which reacts when being mixed to generate a compound other than the intended compound, the aqueous solutions of metal compounds may be individually prepared so that the total concentration of all the aqueous solutions of metal compounds is in the above range and supplied into the reaction tank as individual aqueous solutions of metal compounds at predetermined proportions.

The amounts of the first raw material aqueous solution and second raw material aqueous solution supplied are set so that the concentration of the product (second metal composite hydroxide particles) in the reaction solution (particle growth aqueous solution) is preferably 30 g/L or more and 200 g/L or less, more preferably 80 g/L or more and 150 g/L or less at the end point of the crystallization process. When the concentration of the product is less than 30 g/L, the primary particles may not be sufficiently aggregated. On the other hand, when the concentration of the product exceeds 200 g/L, the aqueous solution for nuclear generation or the aqueous solution for particle growth may not sufficiently diffuse in the reaction tank, and the particle growth may be biased.

(Alkaline Aqueous Solution)

The alkaline aqueous solution for adjusting the pH value in the reaction aqueous solution is not particularly limited, but general aqueous solutions of alkali metal hydroxides such as sodium hydroxide and potassium hydroxide can be used. The alkali metal hydroxide can be directly added to the reaction aqueous solution but is preferably added as an aqueous solution from the viewpoint of ease of pH control. In this case, the concentration of the alkali metal hydroxide aqueous solution is set to preferably 20 mass % to 50 mass % or less, more preferably 20 mass % to 30 mass %. By regulating the concentration of the alkali metal aqueous solution to such a range, it is possible to prevent the pH value from locally increasing at the added location while suppressing the amount of solvent (water amount) supplied to the reaction system and thus to efficiently obtain metal composite hydroxide particles having narrow particle size distribution.

The method for supplying the alkaline aqueous solution is not particularly limited as long as the pH value of the reaction aqueous solution does not locally increase and is maintained in a predetermined range. For example, the reaction aqueous solution may be supplied by a pump capable of controlling the flow rate such as a metering pump while being sufficiently stirred.

(Aqueous Solution Containing Ammonium Ion Supplier)

The aqueous solution containing an ammonium ion supplier is not also particularly limited and, for example, ammonia water or an aqueous solution of ammonium sulfate, ammonium chloride, ammonium carbonate, or ammonium fluoride can be used.

When ammonia water is used as the ammonium ion supplier, the concentration thereof is set to preferably 20 mass % to 30 mass %, more preferably 22 mass % to 28 mass %. By regulating the concentration of ammonia water to such a range, it is possible to suppress loss of ammonia due to volatilization and the like to the minimum and thus to improve the production efficiency.

As the method for supplying the aqueous solution containing an ammonium ion supplier as well, the aqueous solution can be supplied by a pump capable of controlling the flow rate in the same manner as the alkaline aqueous solution.

(Reaction Atmosphere)

The reaction atmosphere in the production method of the present embodiment can be appropriately adjusted depending on the intended structure of the secondary particles 2. For example, in the case of a structure in which the primary particles 1 are densely disposed, it is preferable to control the reaction atmosphere to a non-oxidizing atmosphere having an oxygen concentration of 5 vol % or less, preferably an oxygen concentration of 1 vol % or less. On the other hand, in the case of a structure in which the primary particles 1 are sparsely disposed, the reaction atmosphere can be an oxidizing atmosphere having an oxygen concentration higher than that in the non-oxidizing atmosphere described above.

For example, when the tap density of the metal composite hydroxide is 0.75 g/cm$^3$ or more and 1.35 g/cm$^3$ or less and secondary particles 2 having a multilayer structure are mainly formed, it is preferable to perform the particle growth in the first crystallization process (step S10) and second crystallization process (step S20) while appropriately switching the reaction atmosphere from a non-oxidizing atmosphere having an oxygen concentration of 1 vol % or less to an oxidizing atmosphere having an oxygen concentration higher than that in the non-oxidizing atmosphere and from an oxidizing atmosphere to a non-oxidizing atmosphere.

The non-oxidizing atmosphere is an atmosphere in which the oxygen concentration in the reaction atmosphere is 5 vol % or less, preferably 1 vol % or less. The non-oxidizing atmosphere can be adjusted to be in the above range by controlling the mixed atmosphere of oxygen and an inert gas. The oxidizing atmosphere is only required to have an oxygen concentration in the reaction atmosphere higher than that in the non-oxidizing atmosphere and may be, for example, an atmosphere in which the oxygen concentration exceeds 1 vol %, an atmosphere in which the oxygen concentration exceeds 5 vol %, or the atmosphere.

As described above, by controlling the reaction atmosphere (atmosphere in the reaction tank) to an oxidizing atmosphere or a non-oxidizing atmosphere and controlling the number of switching of the reaction atmosphere, the particle structure, specific surface area, and tap density of the metal composite hydroxide are controlled. For example, the reaction atmosphere is preferably switched four or more times from the viewpoint of obtaining a positive electrode active material having a larger BET specific surface area and the reaction atmosphere is preferably switched four times from the viewpoint of productivity. The timing to switch the reaction atmosphere can be appropriately adjusted depending on the desired thickness of each layer in the multilayer structure.

(Reaction Temperature)

The temperature (reaction temperature) of the reaction aqueous solution is controlled to be in a range of preferably 20° C. or more, more preferably 20° C. or more and 60° C. or less throughout the crystallization process (nuclear generation process and particle growth process, second crystallization process). When the reaction temperature is less than 20° C., nuclear generation is likely to occur as the solubility of reaction aqueous solution decreases and it may be difficult to control the average particle size and particle size distribution of the metal composite hydroxide obtained. The upper limit of the reaction temperature is not particularly limited, but volatilization of ammonia is promoted when the reaction temperature exceeds 60° C., the amount of the aqueous solution which contains an ammonium ion supplier and is supplied in order to control the ammonium ions in the reaction aqueous solution in a certain range increases, and the production cost increases. When the reaction temperature exceeds 60° C., it is concerned that the primary crystals are distorted and the tap density begins to decrease in the nuclear generation process as described above.

(Production Apparatus)

In the method for producing a metal composite hydroxide according to the present embodiment, it is preferable to use an apparatus in which the product is not collected until the reaction is completed, for example, a batch reaction tank. In the case of such an apparatus, the growing particles are not collected at the same time as the overflow liquid unlike the continuous crystallization apparatus in which the product is collected by the overflow method, and thus metal composite hydroxide particles having narrow particle size distribution can be easily obtained.

In the method for producing a metal composite hydroxide of the present embodiment, it is preferable to control the reaction atmosphere during the crystallization reaction and thus to use an apparatus capable of controlling the atmosphere such as a hermetically sealed apparatus. In the case of such an apparatus, it is possible to properly control the reaction atmosphere in the nuclear generation process (step S11) and the particle growth process (steps S12 and S20) and thus to easily obtain the metal composite hydroxide 10 having the above-described particle structure and narrow particle size distribution.

Hereinafter, an example of the metal composite hydroxide 10 that can be obtained by the production method of the present embodiment will be described.

2. Metal Composite Hydroxide

Figure 7:
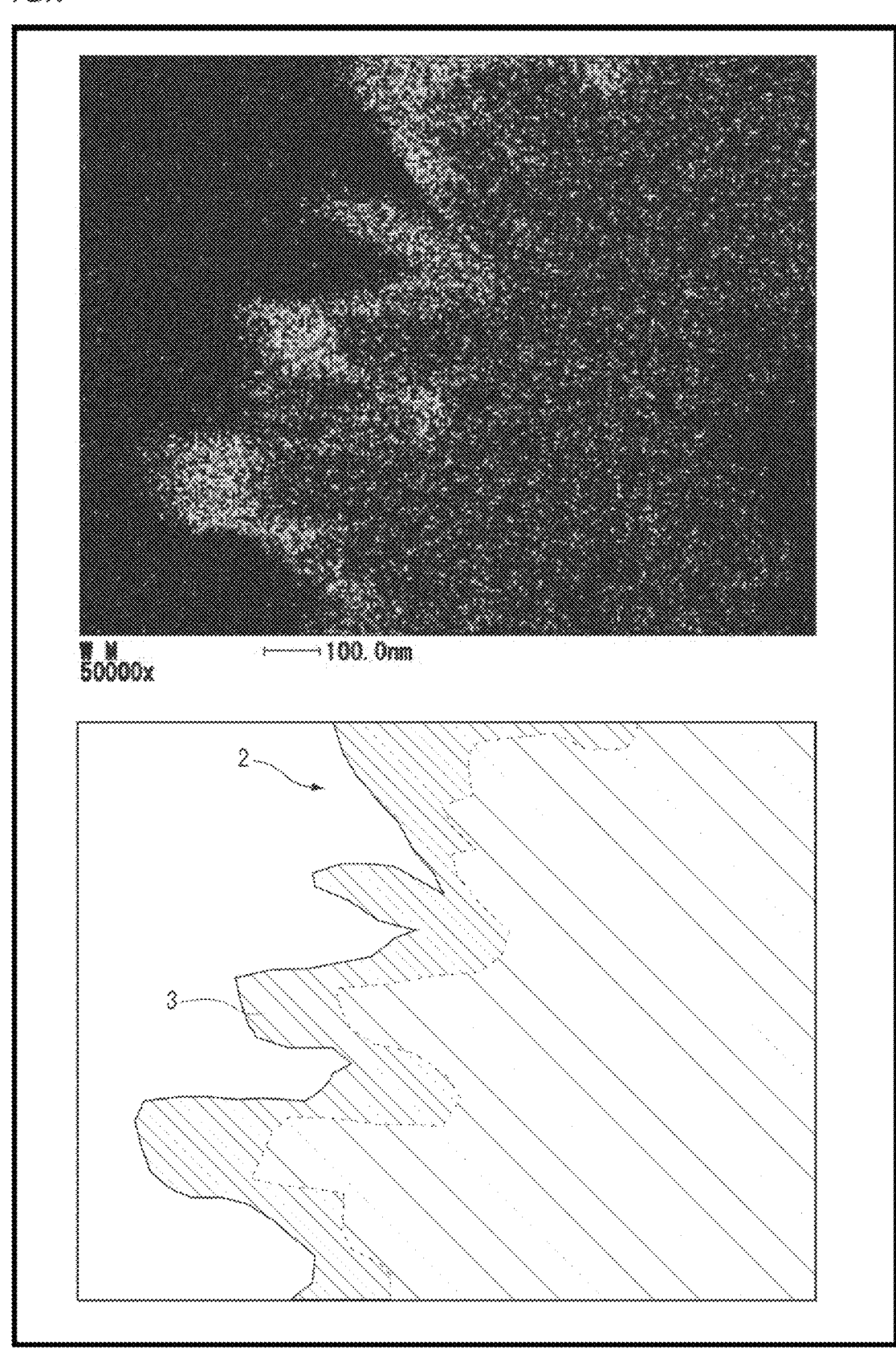
FIG. 7 is a drawing substitute photograph (upper diagram) illustrating an example of the distribution of W in a metal composite hydroxide having a tungsten-concentrated layer by surface analysis using EDX and an explanatory diagram (lower diagram) for explaining the tungsten-concentrated layer in the drawing substitute photograph.

As illustrated in FIG. 1 to FIG. 3, the metal composite hydroxide 10 (secondary particles 2) has a tungsten-concentrated layer 3 in which tungsten is concentrated on the surface layer (surface side). The tungsten-concentrated layer 3 refers to a layered region in which tungsten is present in a more concentrated state than inside the secondary particles 2 and which is disposed on the surface side of the secondary particles 2. The positive electrode active material obtained using the metal composite hydroxide 10 having the tungsten-concentrated layer 3 as a precursor exhibits high crystallinity and has decreased reaction resistance (positive electrode resistance) and a high output when being used in the positive electrode of a secondary battery. The tungsten-concentrated layer 3 can be confirmed by detecting the W distribution by surface analysis using an energy dispersive X-ray analyzer (EDX), for example, as illustrated in FIG. 7.

As will be described later, the tungsten-concentrated layer 3 forms the compound 23 (for example, lithium tungstate) containing tungsten and lithium in the lithium-metal composite oxide 20 (see FIG. 5(B)). The compound 23 containing tungsten and lithium is formed in the process (step S40, see FIG. 6) of obtaining the lithium-metal composite oxide 20 by mixing and firing the metal composite hydroxide 10 (precursor) and a lithium compound.

In the lithium-metal composite oxide 20 (positive electrode active material), the compound 23 containing tungsten and lithium is formed on the surface layer of the primary particles 21 or at the grain boundaries between the primary particles 21. The compound 23 containing tungsten and lithium has a high ionic conductivity and thus the presence of the compound 23 containing tungsten and lithium on the surface layer of the primary particles 21 to be in contact with the electrolyte solution or at the grain boundaries between the primary particles 21 decreases the reaction resistance of the positive electrode active material and can greatly contributes to the output improvement when the lithium-metal composite oxide 20 (positive electrode active material) is used in the positive electrode of a secondary battery.

When a conventional method for producing a metal composite hydroxide is used, tungsten contained in the metal composite hydroxide (precursor) may suppress sintering between the primary particles 1 when firing. For this reason, the conventional precursor containing tungsten has a contradictory problem that the crystallinity of the lithium-metal composite oxide constituting the positive electrode active material decreases while tungsten in the positive electrode active material obtained contributes to a decrease in reaction resistance. Hence, it is difficult to realize a lithium-metal composite oxide exhibiting excellent output characteristics and high crystallinity when being used in the positive electrode of a secondary battery.

On the other hand, in the metal composite hydroxide 10 according to the present embodiment, the tungsten-concentrated layer 3 is formed on the surface layer, and thus the effect of suppressing sintering by tungsten is hardly attained when firing (step S40) but it is possible to decrease the reaction resistance and to enhance the crystallinity of the lithium-metal composite oxide 20 obtained.

In the second crystallization process (step S20, see FIG. 2), it is possible to efficiently deposit the amount of tungsten added in the metal composite hydroxide 10 (secondary particles 2) by adding a more amount of tungsten in a non-oxidizing atmosphere.

(Tungsten-Concentrated Layer)

The thickness of the tungsten-concentrated layer 3 can be, for example, 200 nm or less and is preferably 100 nm or less, more preferably 10 nm or more and 100 nm or less in the direction from the surface of the metal composite hydroxide 10 toward the center. When the thickness of the tungsten-concentrated layer 3 is 100 nm or less, the crystallinity of the lithium-metal composite oxide 20 can be further enhanced and it is possible to further decrease the reaction resistance and to improve the output characteristics when the lithium-metal composite oxide 20 is used in the positive electrode of a secondary battery.

The thickness of the tungsten-concentrated layer 3 can be measured by cutting the metal composite hydroxide 10 embedded in a resin and the like to fabricate a sample of secondary particle 2 cross section and performing surface analysis of the W distribution using EDX. Specifically, in a sample of secondary particle 2 cross section, twenty secondary particle 2 cross sections to be 80% or more of the volume average particle diameter (MV) measured using a laser light diffraction scattering particle size analyzer are randomly selected, the thickness (width) of the site (tungsten-concentrated layer 3) at which W is densely detected in the direction from the surface of the metal composite hydroxide 10 toward the center is measured at five or more locations in each selected secondary particle 2, and the average thickness of the tungsten-concentrated layer 3 in each secondary particle 2 is determined. Thereafter, the average thickness values of the respective twenty secondary particles 2 selected are calculated to attain the thickness of the tungsten-concentrated layer 3.

When the thickness of the tungsten-concentrated layer 3 exceeds 100 nm, the effect of suppressing sintering by tungsten increases when firing and the growth of primary particles may be inhibited. Hence, in the lithium-metal composite oxide obtained, a great number of primary particles having a small crystallite diameter are formed, a great number of crystal grain boundaries are generated, and thus the reaction resistance in the positive electrode may increase. As the growth of the primary particles is suppressed, the crystallinity of the lithium-metal composite oxide 20 may decrease.

On the other hand, when the thickness of the tungsten-concentrated layer 3 is less than 10 nm, the specific surface area increases, and the metal composite hydroxides 10 easily aggregate when firing, thus the packing density of the positive electrode active material obtained may decrease, and the battery capacity per volume may decrease. The compound 23 containing tungsten and lithium is not sufficiently formed in the lithium-metal composite oxide 20 and the lithium ion conductivity is not sufficient in some cases.

The thickness of the tungsten-concentrated layer 3 can be, for example, 3% or less with respect to the average particle size of the metal composite hydroxide 10 in the direction from the surface of the secondary particles 2 toward the center of the secondary particles 2. The thickness of the tungsten-concentrated layer 3 is preferably 2% or less, more preferably 0.1% or more and 2% or less, more preferably 0.1% or more and 1% or less, still more preferably 0.1% or more and 0.5% or less from the viewpoint of further improving the crystallinity of the lithium-metal composite oxide 20 and further decreasing the reaction resistance. The average particle size of the metal composite hydroxide 10 refers to the volume average particle diameter (MV).

(Structure of Secondary Particles)

Figure 4C:
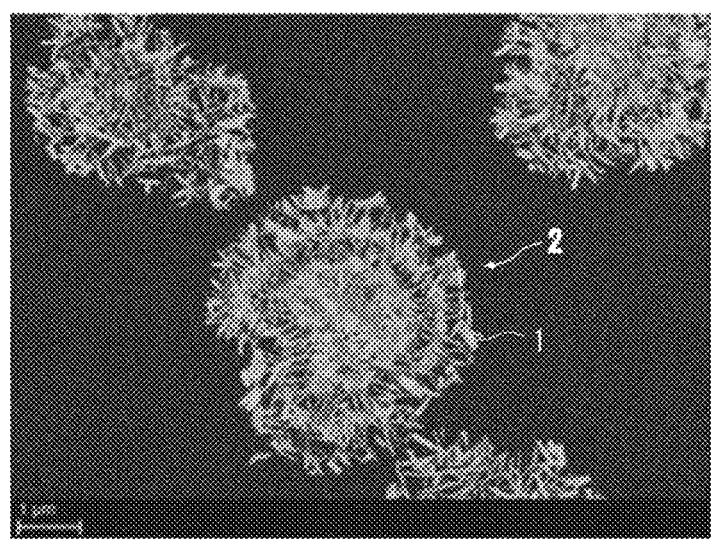
FIG. 4(C) is an example of a cross-sectional SEM image of a metal composite hydroxide.

FIG. 4(A) to FIG. 4(C) are schematic diagrams illustrating an example of the particle structure of the metal composite hydroxide 10 according to the present embodiment, and FIG. 4(C) is a drawing substitute photograph illustrating an example of a cross-sectional SEM image of a metal composite hydroxide having a multilayer structure. As illustrated in FIG. 4(C), the metal composite hydroxide 10 includes secondary particles 2 formed by aggregation of a plurality of primary particles 1. The metal composite hydroxide 10 may include single primary particles 1 in a small amount. Hereinafter, the details of the metal composite hydroxide 10 will be described with reference to FIG. 4(A) to FIG. 4(C).

As illustrated in FIG. 4(C), the metal composite hydroxide 10 includes secondary particles 2 with a plurality of aggregated primary particles 1. The shape of the primary particles 1 is not particularly limited but may be, for example, a plate shape or a needle shape, and the primary particles 1 may be fine primary particles smaller than these. The particle structure of the secondary particles 2 is not particularly limited, and the secondary particles 2 can have conventionally known particle structures such as a solid structure in which voids are hardly observed from the particles, a hollow structure having a hollow part at the center of the particles, a void structure having a plurality of voids, and a multilayer structure having layered voids as in the present embodiment.

Hereinafter, a preferable example of the particle structure of the secondary particles 2 will be described with reference to FIGS. 4(A) and 4(B). The secondary particles 2 (metal composite hydroxide 10) preferably has a multilayer structure at least including the center 4 at which the primary particles 1 are densely disposed, the void 5 at which the primary particles 1 are more sparsely disposed than at the center 4, and the solid portion 6 at which the primary particles 1 are densely disposed from a center C of the secondary particles 2 toward the surface as illustrated in FIGS. 4(A) and 4(B).

As illustrated in FIG. 4(A), the secondary particle 2 is only required to have at least one layer of the void 5 and the solid portion 6 from the center C of the secondary particle 2 toward the surface and may alternately have two layers of the void 5 and the solid portion 6 as illustrated in FIG. 4(B). When the secondary particles 2 have a multilayer structure, the specific surface area of the obtained lithium-metal composite oxide 20 (positive electrode active material) can be increased to improve the output characteristics.

The tungsten-concentrated layer 3 is formed at least at the surface part of the solid portion 6 disposed on the outermost surface of the secondary particles 2. The tungsten-concentrated layer 3 may be formed not only on the surface of the secondary particles 2 but also at the voids 5 and solid portion 6 present inside the secondary particles 2, and the positive electrode active material obtained using this metal composite hydroxide 10 can further decrease the reaction resistance (positive electrode resistance) in the secondary battery when the tungsten-concentrated layer 3 is formed at the solid portion 6 as well.

As described above, by adding a larger amount of the second raw material aqueous solution containing tungsten in a non-oxidizing atmosphere, tungsten can be contained in the solid portion 6 at a higher concentration than in the void 5. The particle structure of the secondary particles 2 can be formed into a multilayer structure by switching the reaction atmosphere in the particle growth process in the crystallization reaction plural times.

(Tap Density)

The tap density of the metal composite hydroxide 10 is not particularly limited but is preferably $0.75 \text{ g/cm}^3$ or more and $1.35 \text{ g/cm}^3$ or less, more preferably $1 \text{ g/cm}^3$ or more and $1.35 \text{ g/cm}^3$ or less, for example, when the secondary particles 2 have a multilayer structure. The tap density of the metal composite hydroxide 10 correlates with the tap density of the lithium-metal composite oxide 20 (positive electrode active material) obtained using the metal composite hydroxide 10 as a precursor, and the tap density of the obtained lithium-metal composite oxide 20 tends to be higher than the tap density of the metal composite hydroxide 10 when the metal composite hydroxide 10 has a multilayer structure. For this reason, the tap density of the lithium-metal composite oxide 20 (see FIG. 5(A)) obtained using the metal composite hydroxide 10 as a precursor can also be controlled to the range to be described later by controlling the tap density of the metal composite hydroxide 10 to be in the above range. A secondary battery having a high battery capacity can be obtained when this lithium-metal composite oxide 20 is used in the positive electrode. On the other hand, when the tap density of the metal composite hydroxide 10 is less than $0.75 \text{ g/cm}^3$, for example, the heaped height of the metal composite hydroxide 10 increases when being heaped in a sagger, firing is not sufficiently performed, and the crystallinity may decrease in the firing process (step S40, see FIG. 6) when the positive electrode active material is produced.

(Average Particle Size)

The average particle size of the metal composite hydroxide 10 is not particularly limited but is preferably 4.0 μm or more, more preferably 4 μm or more and 9.0 μm or less, preferably 4.0 μm or more and 7 μm or less. The average particle size of the metal composite hydroxide 10 correlates with the average particle size of the lithium-metal composite oxide 20 (positive electrode active material) obtained using this metal composite hydroxide 10 as a precursor. For this reason, the average particle size of the lithium-metal composite oxide 20 (see FIG. 5(A)) obtained using this metal composite hydroxide 10 as a precursor can also be controlled to the above range by controlling the average particle size of the metal composite hydroxide 10 to be in the above range.

When the average particle size of the metal composite hydroxide 10 is less than 4 μm, the specific surface area increases, and particles of the metal composite hydroxide 10 easily aggregate in the firing process (step S40, see FIG. 6) when the positive electrode active material is produced, the packing density of the obtained positive electrode active material decreases, and the battery capacity per volume decreases in some cases. In the present specification, the average particle size means the volume average particle diameter (MV) and can be determined, for example, from a volume integrated value measured using a laser light diffraction scattering particle size analyzer.

[(d90−d10)/average particle size] that is an index indicating the spread of particle size distribution of the metal composite hydroxide 10 is 0.65 or less. The particle size distribution of the lithium-metal composite oxide 20 (positive electrode active material) is strongly affected by the metal composite hydroxide 10 that is a precursor of the lithium-metal composite oxide 20. For this reason, the lithium-metal composite oxide 20 also contains a great number of fine particles and coarse particles when the metal composite hydroxide 10 containing a great number of fine particles and coarse particles is used as a precursor. In a secondary battery fabricated using such a lithium-metal composite oxide 20 as a positive electrode active material, battery characteristics such as thermal stability, cycle characteristics, and output characteristics may decrease. Hence, when [(d90−d10)/average particle size] of the metal composite hydroxide 10 is adjusted to the above range, the particle size distribution of the lithium-metal composite oxide 20 obtained using this as a precursor can be narrowed and the contamination with fine particles and coarse particles can be suppressed.

The lower limit of [(d90−d10)/average particle size] of the metal composite hydroxide 10 is not particularly limited but is preferably about 0.25 or more from the viewpoint of cost and productivity. In the case of assuming production on an industrial scale, it is not realistic to use the metal composite hydroxide 10 having an excessively small [(d90−d10)/average particle size].

d10 means the particle size at which the accumulated volume is 10% of the total volume of all particles when the number of particles in each particle size is accumulated from the smaller particle size side, and d90 means a particle size at which the accumulated volume is 90% of the total volume of all particles when the number of particles in each particle size is accumulated from the smaller particle size side in the same manner. d10 and d90 can be determined from the volume integrated value measured using a laser light diffraction scattering particle size analyzer in the same manner as the average particle size.

(Composition)

The composition of the metal composite hydroxide 10 is not particularly limited but it is preferable that, for example, the metal composite hydroxide 10 contains Ni, Mn and W and optionally Co and M and the ratio (A) of the number of atoms of the respective metal elements is Ni:Mn:Co:W:M=x:y:z:a:b (x+y+z=1, $0.3 \leq x \leq 0.95$, $0.05 \leq y \leq 0.55$, $0 \leq z \leq 0.4$, $0 < a \leq 0.1$, $0 \leq b \leq 0.1$, and M is one or more metal elements selected from the group consisting of Mg, Ca, Al, Ti, V, Cr, Zr, Nb, Mo, Hf, and Ta).

The ratio (A) of the number of atoms of the respective metal elements in the metal composite hydroxide 10 is maintained in the lithium-metal composite oxide 20 as well, and thus the composition range of nickel, manganese, cobalt, tungsten, and element M that constitute the metal composite hydroxide 10 represented by the ratio (A) of metal elements and the critical significance thereof in this metal composite hydroxide 10 are the same as those in the positive electrode active material represented by the ratio (B) to be described later. For this reason, description of these matters is omitted here.

The metal composite hydroxide 10 may be represented by a general formula (A1): $Ni_xMn_yCo_zW_aM_b(OH)_{2+\alpha}$ (x+y+z=1, $0.3 \leq x \leq 0.95$, $0.05 \leq y \leq 0.55$, $0 \leq z \leq 0.4$, $0 < a \leq 0.1$, $0 \leq b \leq 0.1$, $0 \leq \alpha \leq 0.5$, and M is one or more metal elements selected from the group consisting of Mg, Ca, Al, Ti, V, Cr, Zr, Nb, Mo, Hf, and Ta).

It is preferable that the composition in the general formula (A1) is set to a general formula (A2): $Ni_xMn_yCo_zM_b(OH)_{2+\alpha}$ (x+y+z=1, $0.7 < x \leq 0.95$, $0.05 \leq y \leq 0.1$, $0 \leq z \leq 0.2$, $0 < a \leq 0.1$, $0 \leq b \leq 0.1$, $0 \leq \alpha \leq 0.5$, and M is one or more elements selected from the group consisting of Mg, Ca, Al, Ti, V, Cr, Zr, Nb, and Mo) from the viewpoint of further improving the capacity characteristics of the secondary battery fabricated using the positive electrode active material obtained. The value of x in the general formula (A2) is set to more preferably $0.7 < x \leq 0.9$, still more preferably $0.7 < x \leq 0.85$ from the viewpoint of achieving both thermal stability and battery capacity.

It is preferable that the composition in the general formula (A1) is set to a general formula (A3): $Ni_xMn_yCo_zW_aM_b(OH)_{2+\alpha}$ (x+y+z=1, $0.3 \leq x \leq 0.7$, $0.1 \leq y \leq 0.55$, $0 \leq z \leq 0.4$, $0 < a \leq 0.1$, $0 \leq b \leq 0.1$, $0 \leq \alpha \leq 0.5$, and M is one or more elements selected from the group consisting of Al, Ti, V, Cr, Zr, Nb, Mo, Hf, and Ta) from the viewpoint of further improving the thermal stability of the secondary battery fabricated using the positive electrode active material obtained.

3. Positive Electrode Active Material for Lithium Ion Secondary Battery

The positive electrode active material according to the present embodiment contains a lithium-metal composite oxide (hereinafter referred to as "lithium-metal composite oxide") which contains lithium, nickel, manganese, and tungsten and optionally cobalt and element M and has a mass ratio (molar ratio) of the respective metal elements represented by Li:Ni:Mn:Co:W:M=(1+u):x:y:z:a:b (x+y+z=1, $-0.05 \leq u \leq 0.50$, $0.3 \leq x \leq 0.95$, $0.05 \leq y \leq 0.55$, $0 \leq z \leq 0.4$, $0 < a \leq 0.1$, $0 \leq b \leq 0.1$, and M is one or more elements selected from the group consisting of Mg, Ca, Al, Ti, V, Cr, Zr, Nb, Mo, Hf, and Ta). The lithium-metal composite oxide has a hexagonal layered crystal structure.

Figure 5A:
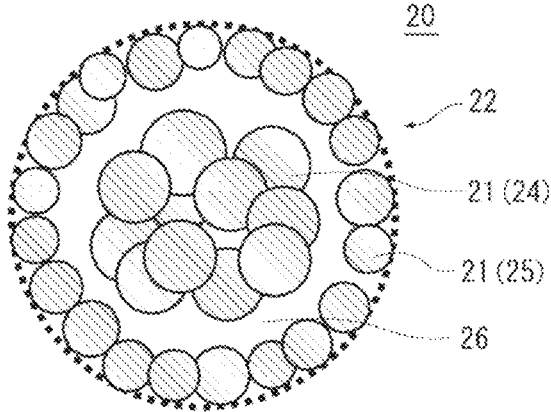
FIG. 5(A) and FIG. 5(B) are schematic diagrams illustrating an example of a lithium-metal composite oxide.
Figure 5B:
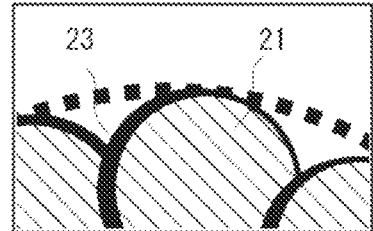

FIG. 5(A) and FIG. 5(B) are schematic diagrams illustrating an example of the lithium-metal composite oxide 20 according to the present embodiment. As illustrated in FIG. 5(A), the lithium-metal composite oxide 20 includes secondary particles 22 formed by aggregation of a plurality of primary particles 21. The lithium-metal composite oxide 20 may include single primary particles 21 in a small amount. Hereinafter, details of the lithium-metal composite oxide 20 will be described with reference to FIG. 5(A) and FIG. 5(B).

(Compound Containing Tungsten and Lithium)

In the lithium-metal composite oxide 20, the compound 23 containing tungsten and lithium is present in a concentrated state on the surface layer of the primary particles 21 present on the surface of or inside the secondary particles 22 or at the grain boundaries between the primary particles 21 as illustrated in FIG. 5(B). The presence site of the compound 23 containing tungsten and lithium can be confirmed by, for example, detecting the W distribution by surface analysis using an energy dispersive X-ray analyzer (EDX). It is preferable that the compound 23 containing tungsten and lithium is present on the surface (surface layer) in a more amount than inside the secondary particles 22.

When the surface layer of the positive electrode active material is coated with a dissimilar compound, the movement (intercalation) of lithium ions is greatly limited, as a result, a high capacity that is an advantage of the lithium-metal composite oxide may not be fully exerted. In contrast, the compound 23 containing tungsten and lithium (for example, lithium tungstate) exhibits high lithium ion conductivity and has an effect of promoting the movement of lithium ions. Hence, the reaction resistance of the positive electrode active material can be decreased and the output characteristics can be improved as a conduction path of Li is formed at the interface with the electrolyte solution by forming the compound 23 containing tungsten and lithium on the surface layer of the primary particles 21 in the vicinity of the surface of the lithium-metal composite oxide 20 according to the present embodiment and at the grain boundaries between the primary particles 21. The compound 23 containing tungsten and lithium can be present, for example, in the form of fine particles in the vicinity of the surface of the lithium-metal composite oxide 20.

The compound 23 containing tungsten and lithium is not particularly limited, and examples thereof include lithium tungstates such as $Li_2WO_4$, $Li_4WO_5$, and $Li_2W_2O_7$. As these lithium tungstates are formed in a concentrated state on the surface layer of the primary particles 21 present on the surface of or inside the secondary particles 22 and at the grain boundaries between the primary particles 21, the lithium ion conductivity of the lithium-metal composite oxide 20 further increases and the reaction resistance further decreases when the lithium-metal composite oxide 20 is used in the positive electrode of a secondary battery.

(Particle Structure)

The lithium-metal composite oxide 20 in the present embodiment inherits the multilayer structure that is a feature of the metal composite hydroxide 10, has an increased contact area with the electrolyte solution while maintaining sufficient particle strength, and exhibits excellent output characteristics.

The structure of the secondary particles 22 of the lithium-metal composite oxide 20 is not particularly limited but preferably has a multilayer structure at least including a center 24 at which the primary particles 21 are densely disposed, a void 26 at which the primary particles 21 are more sparsely disposed than at the center 24, and a dense solid portion 25 at which the primary particles 21 are densely disposed from the center of the secondary particles 22 toward the surface as illustrated in FIG. 5(A). It is preferable that the dense solid portion 25 is electrically conductive with the center 24.

When the lithium-metal composite oxide 20 including the void 26 as described above is used as a positive electrode of a secondary battery, the electrolyte solution enters the inside of the secondary particles 22, the contact area between the primary particles 21 inside the secondary particles 22 and the electrolyte solution increases, and thus lithium can be de-inserted and inserted not only on the surface of the secondary particles 22 but also inside the secondary particles 22. There are a great number of electrically conductive paths inside the secondary particles 22, thus the resistance inside the secondary particles 22 can be decreased, and the output characteristics can be improved. Hence, when the positive electrode of a secondary battery is configured using this lithium-metal composite oxide 20, the output characteristics can be greatly improved without impairing the capacity characteristics and the cycle characteristics.

In the lithium-metal composite oxide 20, the void 26 may be formed in a layered shape as a whole between the center 24 and the dense solid portion 25 and between the plurality of dense solid portions 25 or may be formed partially. The center may be in a state in which a plurality of aggregated sections formed by aggregation of plate-shaped primary particles are connected to each other. In the present specification, "electrically conductive" means that the high den-sity sections of the lithium-metal composite oxide are directly and structurally connected to each other and in an electrically conductive state.

The secondary particles having a multilayer structure can be formed by appropriately adjusting the respective conditions in the above-described nuclear generation process (step S11) and particle growth process (step S12), and, for example, the conditions described in Patent Literatures 2 and 3 and the like may be used. A plurality of dense solid portions 25 may be present, and the dense solid portion 25 may be composed of an outer shell section or an outer shell section and an inner shell section, for example, as described in Patent Literature 3. The center 24 may have a hollow structure.

In the positive electrode active material according to the present embodiment, the lithium-metal composite oxide 20 in which the compound 23 containing lithium and tungsten is present in the surface layer of the primary particles 21 and at the grain boundaries between the primary particles 21 can be obtained using the above-described metal composite hydroxide 10 as a precursor. The lithium-metal composite oxide 20 can realize further improvement in output characteristics while maintaining the crystallinity of the positive electrode active material including the secondary particles 22 having a multilayer structure.

(BET Specific Surface Area)

The BET specific surface area of the positive electrode active material is not particularly limited but is, for example, preferably 1.45 $m^2$/g or more and 5.40 $m^2$/g or less, more preferably 2 $m^2$/g or more and 5.40 $m^2$/g or less, still more preferably 2.5 $m^2$/g or more and 5.40 $m^2$/g or less. When the BET specific surface area is in the above range, the contact area with the electrolyte solution can be increased when the positive electrode active material is used in the positive electrode of a secondary battery, the positive electrode resistance can be decreased, and the output characteristics can be improved.

(Tap Density)

The tap density of the positive electrode active material is not particularly limited but is preferably 1 g/$cm^3$ or more and 2 g/$cm^3$ or less, more preferably 1.2 g/$cm^3$ or more and 2 g/$cm^3$ or less, for example, when the secondary particles 2 have a multilayer structure. When the tap density of the positive electrode active material is in the above range, the output characteristics are improved as the contact area with the electrolyte solution increases while the battery capacity per unit volume is improved. On the other hand, when the tap density exceeds 2 g/$cm^3$, there are fewer parts having voids in the particle structure, and the average particle size tends to increase, and the output characteristics decrease as the reaction area decreases. When the spread of particle size distribution is wide, the tap density tends to increase, but in this case, the fine particles are selectively deteriorated and the cycle characteristics decrease in some cases. On the other hand, when the tap density is less than 1 g/$cm^3$, the parts having voids increase in the particle structure, the particle strength decreases, and thus the cycle characteristics decrease in some cases. The packing property of the positive electrode active material decreases and it is difficult to increase the battery capacity per unit volume.

(Average Particle Size)

The average particle size (MV) of the positive electrode active material of the present embodiment is not particularly limited but can be adjusted, for example, to be 3 μm or more and 9 μm or less. When the average particle size is in the above range, not only the battery capacity per unit volume of the secondary battery fabricated using this positive electrode active material can be increased but also the thermal stability and output characteristics can be improved. In contrast, when the average particle size is less than 4 μm, the packing property of the positive electrode active material decreases and it is difficult to increase the battery capacity per unit volume. On the other hand, when the average particle size exceeds 9 μm, the reaction area of the positive electrode active material begins to decrease and thus the output characteristics may not be sufficient.

The average particle size of the positive electrode active material means the volume mean diameter (MV) and can be determined, for example, from a volume integrated value measured using a laser light diffraction scattering particle size analyzer in the same manner as that of the metal composite hydroxide described above.
(Particle Size Distribution)

It is preferable that [(d90–d10)/average particle size] that is an index indicating the spread of particle size distribution is 0.65 or less in the positive electrode active material of the present embodiment. When [(d90–d10)/average particle size] is in the above range, the lithium-metal composite oxide 20 having significantly narrow particle size distribution can be configured. Such a positive electrode active material has a small proportion of fine particles and coarse particles, and a secondary battery fabricated using this in the positive electrode exhibits excellent thermal stability, cycle characteristics, and output characteristics.

On the other hand, when [(d90–d10)/average particle size] exceeds 0.65, the proportion of fine particles and coarse particles in the positive electrode active material increases. In a secondary battery fabricated using a positive electrode active material having wide spread of particle size distribution, for example, heat is generated due to local reaction of fine particles, and thermal stability decreases as well as fine particles are selectively deteriorated and cycle characteristics decrease in some cases. In a secondary battery fabricated using a positive electrode active material having wide spread of particle size distribution, the proportion of coarse particles is high, thus the reaction area between the electrolyte solution and the positive electrode active material cannot be sufficiently secured, and the output characteristics decrease in some cases.

In the case of assuming production on an industrial scale, it is not realistic to use a positive electrode active material having an excessively small [(d90–d10)/average particle size]. Hence, the lower limit of [(d90–d10)/average particle size] is preferably set to about 0.25 in the consideration of cost and productivity. The meanings of d10 and d90 in [(d90–d10)/average particle size] and the method to determine these are the same as those in the metal composite hydroxide described above.
(Crystallite Diameter)

The crystallite diameter of (003) plane in the positive electrode active material according to the present embodiment attained by powder X-ray diffraction measurement can be further increased as compared with that in a positive electrode active material fabricated using a metal composite hydroxide obtained by uniformly adding tungsten throughout the crystallization process as a precursor as in the conventional production method. The crystallite diameter of (003) plane in the positive electrode active material can be set to, for example, 110 nm or more and is preferably adjusted to 120 nm or more. When the crystallite diameter of (003) plane in the positive electrode active material is 120 nm or more, the crystallinity is high and the output characteristics and thermal stability of a secondary battery fabricated using this positive electrode active material as the positive electrode are both improved since the secondary battery has low reaction resistance. On the other hand, when the crystallite diameter of (003) plane is less than 110 nm, the thermal stability of the secondary battery may decrease. The upper limit of the crystallite diameter of (003) plane is not particularly limited but can be set to, for example, 200 nm or less, and is preferably 110 nm or more and 150 nm or less. The positive electrode active material of the present embodiment can maintain high crystallinity as the metal composite hydroxide 10 having the tungsten-concentrated layer 3 on the surface is used as a precursor as described above, and thus the crystallite diameter of (003) plane can be set to the above range.
(Composition)

The composition of the positive electrode active material of the present embodiment is not particularly limited as long as the above-described characteristics are exhibited, but is represented by, for example, a general formula (B): $Li_{1+u}Ni_xMn_yCozW_aM_bO_2$ ($-0.05 \leq u \leq 0.50$, $x+y+z=1$, $0.3 \leq x \leq 0.95$, $0.05 \leq y \leq 0.55$, $0 \leq z \leq 0.4$, $0 < a \leq 0.1$, $0 \leq b \leq 0.1$, and M is one or more elements selected from the group consisting of Mg, Ca, Al, Ti, V, Cr, Zr, Nb, Mo, Hf, and Ta).

In the general formula (B), the value of u indicating the amount of lithium (Li) is preferably −0.05 or more and 0.50 or less, more preferably 0 or more and 0.50 or less, still more preferably 0 or more and 0.35 or less. When the value of u is in the above range, the output characteristics and capacity characteristics of the secondary battery fabricated using this positive electrode active material as a positive electrode material can be improved. In contrast, when the value of u is less than −0.05, the positive electrode resistance of the secondary battery increases and the output characteristics cannot be improved. On the other hand, when the value of u exceeds 0.50, the initial discharge capacity may decrease or the positive electrode resistance may increase.

In the general formula (B), the value of x indicating the content of nickel (Ni) is preferably 0.3 or more and 0.95 or less, more preferably 0.3 or more and 0.9 or less. Nickel is an element which contributes to increases in potential and capacity enlargement of a secondary battery. When the value of x is less than 0.3, the capacity characteristics of the secondary battery fabricated using this positive electrode active material cannot be improved. On the other hand, when the value of x exceeds 0.95, the contents of other elements decrease and the effect by the other elements cannot be attained.

In the general formula (B), the value of y indicating the content of manganese (Mn) is preferably 0.05 or more and 0.55 or less, more preferably 0.10 or more and 0.40 or less. Manganese is an element which contributes to the improvement in thermal stability. When the value of y is less than 0.05, the thermal stability of the secondary battery fabricated using this positive electrode active material cannot be improved. On the other hand, when the value of y exceeds 0.55, Mn is eluted from the positive electrode active material at the time of high temperature operation and the charge and discharge cycle characteristics may be deteriorated.

In the general formula (B), the value of z indicating the content of cobalt (Co) is preferably 0 or more and 0.4 or less, more preferably 0.10 or more and 0.35 or less. Cobalt is an element which contributes to the improvement in charge and discharge cycle characteristics. When the value of z exceeds 0.4, the initial discharge capacity of the secondary battery fabricated using this positive electrode active material may greatly decrease.

In the general formula (B), the value of a indicating the content of tungsten (W) is more than 0 and 0.1 or less, preferably 0.001 or more and 0.01 or less, more preferably 0.0045 or more and 0.006 or less when the sum of the number of moles of Ni, Co, and Mn is regarded as 1. When the value of a is in the above range, the positive electrode active material exhibits superior output characteristics and cycle characteristics while maintaining high crystallinity. W is mainly contained in the surface layer of the primary particles 21 in the vicinity of the surface of the secondary particles 22 or the grain boundaries between the primary particles 21 in the positive electrode active material as described above.

In the positive electrode active material of the present embodiment, element M may be contained in addition to the metal elements described above in order to further improve the durability and output characteristics of the secondary battery. As such element M, one or more selected from the group consisting of magnesium (Mg), calcium (Ca), aluminum (Al), titanium (Ti), vanadium (V), chromium (Cr), zirconium (Zr), niobium (Nb), molybdenum (Mo), hafnium (Hf), and tantalum (Ta) can be used.

In the general formula (B), the value of b indicating the content of element M is preferably 0 or more and 0.1 or less, more preferably 0.001 or more and 0.05 or less when the sum of the number of moles of Ni, Co, and Mn is regarded as 1. When the value of b exceeds 0.1, the metal elements contributing to the redox reaction decrease and thus the battery capacity may decrease.

It is preferable that the composition of the positive electrode active material represented by the general formula (B) is set to a general formula (B1): $Li_{1+u}Ni_xMn_y$-$Co_zW_aMbO_2$ ($-0.05 \leq u \leq 0.20$, $x+y+z=1$, $0.7 < x \leq 0.95$, $0.05 \leq y \leq 0.1$, $0 \leq z \leq 0.2$, $0 < a \leq 0.1$, $0 \leq b \leq 0.1$, and M is one or more elements selected from the group consisting of Mg, Ca, Al, Ti, V, Cr, Zr, Nb, Mo, Hf, and Ta) from the viewpoint of further improving the capacity characteristics of the secondary battery. Among these, the value of x in the general formula (Bi) is more preferably set to $0.7 < x \leq 0.9$, still more preferably set to $0.7 < x \leq 0.85$ from the viewpoint of achieving both thermal stability and battery capacity.

It is preferable that the composition is set to a general formula (B2): $Li_{1+u}Ni_xMn_yCo_zW_aM_bO_2$ ($-0.05 \leq u \leq 0.50$, $x+y+z=1$, $0.3 \leq x \leq 0.7$, $0.1 \leq y \leq 0.55$, $0 \leq z \leq 0.4$, $0 < a \leq 0.1$, $0 \leq b \leq 0.1$, and M is one or more elements selected from the group consisting of Mg, Ca, Al, Ti, V, Cr, Zr, Nb, Mo, Hf, and Ta) from the viewpoint of achieving further improvement in thermal stability.

Figure 6:
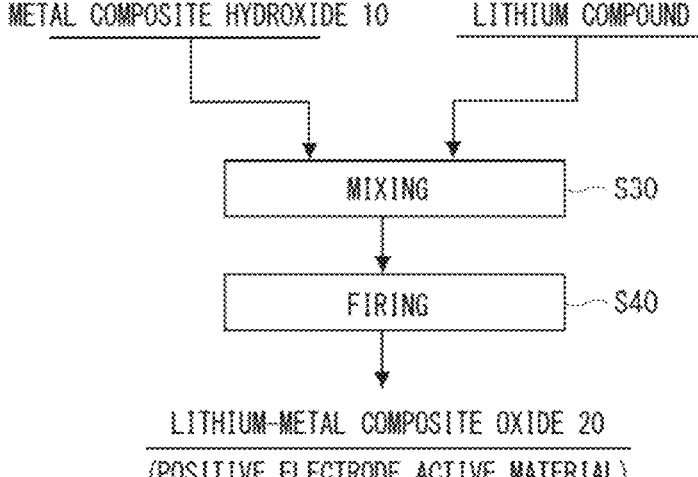
FIG. 6 is a diagram illustrating an example of a method for producing a lithium-metal composite oxide.

4. Method for Producing Positive Electrode Active Material for Lithium Ion Secondary Battery FIG. 6 is a diagram illustrating an example of the method for producing a positive electrode active material according to the present embodiment. By the production method of the present embodiment, a positive electrode active material containing the above-described lithium-metal composite oxide 20 can be easily produced on an industrial scale. The positive electrode active material containing the lithium-metal composite oxide 20 is not particularly limited as long as it has the above-described specific structure, average particle size, and particle size distribution, and can be obtained by a known production method.

As illustrated in FIG. 6, the method for producing the positive electrode active material according to the present embodiment includes a process (step S30) of mixing the metal composite hydroxide obtained by the above-described production method with a lithium compound to obtain a lithium mixture and a process (step S40) of firing the lithium mixture to obtain a lithium-metal composite oxide. Processes such as a heat treatment process and a calcination process may be additionally performed other than the processes described above, if necessary.

Tungsten in the tungsten-concentrated layer formed on the surface layer of the metal composite hydroxide reacts with the lithium compound in the mixing process (step S30) of mixing the metal composite hydroxide with a lithium compound and the firing process (step S40) to form the compound 23 containing tungsten and lithium on the surface layer of the primary particles in the lithium-metal composite oxide 20 and at the grain boundaries between the primary particles. Hereinafter, the method for producing the positive electrode active material according to the present embodiment will be described with reference to FIG. 6.

(Mixing Process)

First, at least either of the metal composite hydroxide or a metal composite oxide obtained by subjecting the metal composite hydroxide to a heat treatment (hereinafter, these are collectively referred to as "precursor") is mixed with a lithium compound to obtain a lithium mixture (step S30).

In step S30, the precursor and the lithium compound are mixed so that the ratio (Li/Me) of the sum (Me) of the number of atoms of metal atoms other than lithium in the lithium mixture, specifically nickel, cobalt, manganese, and element M to the number of atoms of lithium (Li) is 0.95 or more and 1.5 or less, preferably 1.0 or more and 1.5 or less, more preferably 1.0 or more and 1.35 or less, still more preferably 1.0 or more and 1.2 or less. In other words, Li/Me does not change after the firing process, and thus the precursor and the lithium compound are mixed so that Li/Me in the mixing process becomes Li/Me of the intended positive electrode active material. Li/Me may exceed 1 or 1.1 from the viewpoint of sufficiently forming the compound 23 containing tungsten and lithium.

The lithium compound used in the mixing process is not particularly limited, but it is preferable to use lithium hydroxide, lithium nitrate, lithium carbonate, or any mixture of these from the viewpoint of easy procurement. In particular, it is preferable to use lithium hydroxide or lithium carbonate in consideration of ease of handling and quality stability.

It is preferable that the precursor and the lithium compound are sufficiently mixed to an extent to which fine powders are not generated. Insufficient mixing may cause variation in Li/Me among individual particles, and sufficient battery characteristics cannot be attained in some cases. A general mixer can be used for mixing. For example, a shaker mixer, a Lodige mixer, a Julia mixer, and a V blender can be used.

(Heat Treatment Process)

A process (heat treatment process) of subjecting the metal composite hydroxide to a heat treatment may optionally be provided before the mixing process (step S30). The precursor obtained through a heat treatment may be mixed with a lithium compound (not illustrated). Here, the precursor obtained after a heat treatment may include the metal composite hydroxide from which at least a part of excess moisture has been removed in the heat treatment process, the precursor (metal composite oxide) converted from the metal composite hydroxide to an oxide by the heat treatment process, or a mixture of these.

The heat treatment process is a process of subjecting the metal composite hydroxide to a heat treatment through heating to remove at least a part of moisture contained in the metal composite hydroxide. This makes it possible to decrease the moisture remaining until the firing process (step S40) is terminated to a certain amount and to suppress the variation in composition of the positive electrode active material obtained.

The heat treatment temperature is, for example, 105° C. or more and 750° C. or less. When the heat treatment temperature is less than 105° C., excess moisture in the metal composite hydroxide cannot be sufficiently removed and variation cannot be sufficiently suppressed in some cases. On the other hand, when the heat treatment temperature exceeds 700° C., not only a further effect cannot be expected but also the production cost increases.

In the heat treatment process, it is only required to remove moisture to an extent to which the proportions of the number of atoms of each metal component in the positive electrode active material and the number of atoms of Li do not vary, and thus it is not necessarily required to convert all the metal composite hydroxides to composite oxides. However, from the viewpoint of decreasing variations in the proportions of the number of atoms of each metal component and the number of atoms of Li, it is preferable to convert all the metal composite hydroxides to composite oxides by performing the heat treatment at 400° C. or more. The above-described variations can be further suppressed by determining the numbers of atoms of the metal components contained in the metal composite hydroxide depending on the heat treatment conditions by analysis in advance and determining the mixing ratio with the lithium compound.

The atmosphere in which the heat treatment is performed is not particularly limited and may be a non-reducing atmosphere, but the heat treatment is preferably performed in the air flow from the viewpoint of simply performing the heat treatment.

The heat treatment time is not particularly limited but is set to preferably 1 hour or more, more preferably 5 hours or more and 15 hours or less from the viewpoint of sufficiently removing moisture in the metal composite hydroxide.

(Firing Process)

Subsequently, the lithium mixture obtained in the mixing process (step S30) is fired to obtain a lithium-metal composite oxide (step S40). The present process is a process of performing firing under predetermined conditions and thus diffusing lithium into the precursor to obtain a lithium-metal composite oxide. The lithium-metal composite oxide obtained may be used as a positive electrode active material as it is or used as a positive electrode active material after being subjected to the adjustment of particle size distribution by a crushing process as will be described later.

[Firing Temperature]

The firing temperature of the lithium mixture is preferably 650° C. or more and 980° C. or less. When the firing temperature is less than 650° C., lithium does not sufficiently diffuse into the precursor, and excess lithium and the unreacted metal composite hydroxide or metal composite oxide may remain or the crystallinity of the lithium-metal composite oxide obtained may be insufficient. On the other hand, when the firing temperature exceeds 980° C., the lithium composite oxide particles are vigorously sintered with each other, abnormal particle growth is caused, and the proportion of irregular coarse particles increases in some cases.

In the case of attempting to obtain the positive electrode active material represented by the general formula (B1), the firing temperature is preferably set to 650° C. or more and 900° C. or less. On the other hand, in the case of attempting to obtain the positive electrode active material represented by the general formula (B2), the firing temperature is preferably set to 800° C. or more and 980° C. or less.

The rate of temperature increase to the firing temperature is preferably 2° C./min or more and 10° C./min or less and may be 5° C./min or more and 9° C./min or less. The lithium mixture may be maintained at a temperature close to the melting point of the lithium compound used for preferably 1 hour or more and 5 hours or less, more preferably 2 hours or more and 5 hours or less in the firing process (step S40). This makes it possible to more uniformly react the precursor with the lithium compound.

[Firing Time]

The maintenance time (firing time) at the firing temperature is set to preferably at least 2 hours or more, more preferably 4 hours or more and 24 hours or less. The maintenance time (firing time) at the firing temperature may be 2 hours or more and 15 hours or less or 2 hours or more and 10 hours or less. When the maintenance time at the firing temperature is less than 2 hours, lithium does not sufficiently diffuse into the precursor, and excess lithium and the unreacted metal composite hydroxide or metal composite oxide may remain or the crystallinity of the lithium-metal composite oxide obtained may be insufficient.

[Cooling Rate]

The cooling rate from the firing temperature to at least 200° C. after termination of the firing time (maintenance time) is set to preferably 2° C./min or more and 10° C./min or less, more preferably 3° C./min or more and 7° C./min or less. By controlling the cooling rate to be in the above range, it is possible to prevent the facilities such as the sagger from being damaged by rapid cooling while securing the productivity.

[Firing Atmosphere]

The atmosphere when firing is set to preferably an oxidizing atmosphere, more preferably an atmosphere having an oxygen concentration of 18 vol % to 100 vol %, particularly preferably a mixed atmosphere of oxygen having the above oxygen concentration and an inert gas. In other words, firing is preferably performed in the air or in an oxygen flow. When the oxygen concentration is less than 18 vol %, it is concerned that the crystallinity of the lithium composite oxide particles is insufficient.

[Firing Furnace]

The furnace used in the firing process (step S40) is not particularly limited and may be a furnace capable of heating the lithium mixture in the air or in an oxygen flow. However, from the viewpoint of uniformly maintaining the atmosphere in the furnace, an electric furnace which does not cause gas generation is preferable, and the electric furnace may be a batch type electric furnace or a continuous type electric furnace. As the furnaces used in the heat treatment process and the calcination process, the same furnace as the above can be selected from the viewpoint of uniformly maintaining the atmosphere in the furnace.

(Calcination Process)

When lithium hydroxide and lithium carbonate are used as the lithium compound, calcination may be performed after the mixing process (step S30) and before the firing process (step S40). Calcination is a process of calcining the lithium mixture at a temperature lower than the firing temperature to be described later and at 350° C. or more and 800° C. or less, preferably 450° C. or more and 780° C. or less. This makes it possible to sufficiently diffuse lithium into the precursor and to obtain more uniform lithium composite oxide particles.

The maintenance time at the temperature is set to preferably 1 hour or more and 10 hours or less, more preferably 3 hours or more and 6 hours or less. The atmosphere in the calcination process is set to preferably an oxidizing atmosphere, more preferably an atmosphere having an oxygen concentration of 18 vol % or more and 100 vol % or less in the same manner as in the firing process described above (step S40).

(Crushing Process)

The lithium-metal composite oxide 20 obtained by the firing process (Step S40) is aggregated or slightly sintered in some cases. In such a case, it is preferable to crush the aggregate or sintered body of the secondary particles 22 of the lithium-metal composite oxide 20. This makes it possible to adjust the volume average particle diameter (MV) and particle size distribution of the positive electrode active material obtained to be in suitable ranges. Crushing means operation to apply mechanical energy to the aggregate which is composed of a plurality of secondary particles 22 and generated by sintering necking between the secondary particles 22 when firing and the like, thus to separate the secondary particles 22 from each other while hardly destroying the secondary particles 22 themselves, and to loosen the aggregate.

As the method of crushing, a known means can be used and, for example, a pin mill and a hammer mill can be used. It is preferable to adjust the crushing force to a proper range so as not to destroy the secondary particles at this time.

5. Lithium Ion Secondary Battery

The lithium ion secondary battery (hereinafter also referred to as "secondary battery") according to the present embodiment includes a positive electrode including the positive electrode active material described above, a negative electrode, and an electrolyte. The lithium ion secondary battery can be composed of the same components as those of conventionally known lithium ion secondary batteries, and may be, for example, a non-aqueous electrolyte solution secondary battery including a positive electrode, a negative electrode, and a non-aqueous electrolyte solution. The secondary battery may be, for example, an all-solid-state secondary battery including a positive electrode, a negative electrode, and a solid electrolyte. Hereinafter, each component will be described.

It should be noted that the embodiment described below is merely an example, and the lithium ion secondary battery according to the present embodiment can be implemented in various modified forms or improved forms based on the embodiment described here on the basis of the knowledge of those skilled in the art. The applications of the lithium ion secondary battery according to the present embodiment are not particularly limited.

(Positive Electrode)

A positive electrode mixture paste containing a positive electrode active material may be used to fabricate the positive electrode of the lithium ion secondary battery, for example, as follows.

The positive electrode mixture paste is applied to, for example, the surface of an aluminum foil current collector and dried to scatter the solvent. Pressurization may be performed by roll press or the like in order to increase electrode density if necessary. In this manner, a sheet-shaped positive electrode can be fabricated. The sheet-shaped positive electrode can be cut into an appropriate size or the like depending on the intended battery and used in the fabrication of battery. However, a method for fabricating the positive electrode is not limited to the exemplified one, and another method may be adopted.

(Negative Electrode)

As the negative electrode, metal lithium, a lithium alloy, or the like may be used. Alternatively, a negative electrode may be formed by mixing a binding agent with a negative electrode active material that can insert and de-insert lithium ions, adding an appropriate solvent thereto to form a paste-like negative electrode mixture, applying the paste-like negative electrode mixture to the surface of a metal foil current collector such as copper, drying the negative electrode mixture, and compressing the resulting product in order to increase the electrode density if necessary.

As the negative electrode active material, natural graphite, artificial graphite, a fired organic compound such as a phenol resin, and a powdery carbon material such as coke can be used. In this case, as the negative electrode binding agent, for example, a fluorine-containing resin such as PVDF can be used as in the positive electrode. As the solvent for dispersing the active material and the binding agent, an organic solvent such as N-methyl-2-pyrrolidone can be used.

(Separator)

A separator is disposed by being interposed between the positive electrode and the negative electrode. The separator separates the positive electrode and the negative electrode from each other and retains the electrolyte, and a thin film which is formed of polyethylene, polypropylene, or the like and has a large number of minute holes can be used.

(Non-Aqueous Electrolyte)

As the non-aqueous electrolyte, for example, a non-aqueous electrolyte solution, a solid electrolyte and the like are used.

The non-aqueous electrolyte solution is obtained by dissolving a lithium salt as a supporting salt in an organic solvent. As the organic solvent, one selected from the group consisting of cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, further, ether compounds such as tetrahydrofuran, 2-methyltetrahydrofuran, and dimethoxyethane, sulfur compounds such as ethyl methyl sulfone and butane sultone, and phosphorus compounds such as triethyl phosphate and trioctyl phosphate can be used singly, or two or more kinds thereof can be used in mixture.

As the supporting salt, $LiPF_6$, $LiBF_4$, $LiClO_4$, $LiAsF_6$, $LiN(CF_3SO_2)_2$, and the like and a composite salt of these can be used. The non-aqueous electrolyte solution may contain a radical scavenger, a surfactant, a flame retardant, and the like.

As the solid electrolyte, an oxide-based solid electrolyte, a sulfide solid electrolyte and the like are used.

The oxide-based solid electrolyte is not particularly limited, and any compound which contains oxygen (O) and exhibits lithium ion conductivity and electronic insulation property can be used. Examples of the oxide-based solid electrolyte include lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$ $Li_{1+x}Al_xTi_{2-x}$ $(PO_4)_3$ $(0{\leq}X{\leq}1)$, $Li_{1+x}Al_xGe_{2-x}$ $(PO_4)_3$ $(0{\leq}X{\leq}1)$, $LiTi_2$ $(PO_4)_3$, $Li_{3x}La_{2/3-x}TiO_3$ $(0{\leq}X{\leq}2/3)$, $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$.

The sulfide solid electrolyte is not particularly limited, and any compound which contains sulfur (S) and exhibits lithium ion conductivity and electronic insulation property can be used. Examples of the sulfide solid electrolyte include $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$.

As the inorganic solid electrolyte, inorganic solid electrolytes other than those described above may be used and, for example, $Li_3N$, $LiI$, $Li_3N$—$LiI$—$LiOH$ and the like may be used.

The organic solid electrolyte is not particularly limited as long as it is a polymer compound exhibiting ionic conductivity, and, for example, polyethylene oxide, polypropylene oxide, and copolymers thereof can be used. The organic solid electrolyte may contain a supporting salt (lithium salt). In the case of using a solid electrolyte, the solid electrolyte may also be mixed in the positive electrode material in order to secure the contact of the electrolyte with the positive electrode active material.

(Shape and Configuration of Battery)

The lithium ion secondary battery according to the present embodiment composed of the positive electrode, negative electrode, separator, and non-aqueous electrolyte described above can have various shapes such as a cylindrical shape and a laminated shape. Even when the secondary battery has any shape, the positive electrode and the negative electrode are laminated with the separator interposed therebetween to form an electrode body, the obtained electrode body is impregnated with the non-aqueous electrolyte solution, the positive electrode collector is connected to the positive electrode terminal communicating with the outside using a current collecting lead or the like, the negative electrode collector is connected to the negative electrode terminal communicating with the outside using a current collecting lead or the like, and the resulting product is sealed in the battery case to complete the lithium ion secondary battery.

In the case of using a solid electrolyte, the positive electrode and the negative electrode are laminated with the solid electrolyte interposed therebetween, the positive electrode collector is connected to the positive electrode terminal communicating with the outside using a current collecting lead or the like, the negative electrode collector is connected to the negative electrode terminal communicating with the outside using a current collecting lead or the like, and the resulting product is sealed in the battery case to complete the lithium ion secondary battery.

(3) Characteristics of Lithium Ion Secondary Battery

The lithium ion secondary battery of the present invention exhibits excellent capacity characteristics, output characteristics, and cycle characteristics since the positive electrode active material of the present invention is used as a positive electrode material in this secondary battery as described above. Moreover, it can be said that this secondary battery is superior in the thermal stability to a secondary battery in which a positive electrode active material containing conventional lithium-nickel-based oxide particles is used as well.

(4) Application

The lithium ion secondary battery of the present invention exhibits excellent capacity characteristics, output characteristics, and cycle characteristics as described above and can be suitably utilized as a power source for small-sized portable electronic devices (notebook personal computers, telephone terminals and the like) which are required to exhibit these characteristics at a high level. The lithium ion secondary battery of the present invention also exhibits excellent thermal stability, not only can be decreased in size and have a high output but also can simplify an expensive protection circuit, and thus can be suitably utilized as a power source for transportation equipment to be mounted in a restricted space.

EXAMPLES

Hereinafter, the present invention will be described in detail with reference to Examples and Comparative Examples. In the following Examples and Comparative Examples, the respective reagent grade samples manufactured by FUJIFILM Wako Pure Chemical Corporation were used in the fabrication of metal composite hydroxides and positive electrode active materials unless otherwise stated. Throughout the nuclear generation process and particle growth process, the pH value of the reaction aqueous solution was measured using a pH controller (NPH-690D manufactured by Nisshin Rika Co., Ltd.) and the amount of sodium hydroxide aqueous solution supplied was adjusted based on this measured value to control the fluctuation range of pH value of the reaction aqueous solution in each process in a range of ±0.2.

Example 1

(a) Production of Metal Composite Hydroxide
[First Crystallization Process]
(Nuclear Generation Process)

First, 1.2 L of water was put in a reaction tank, and the temperature in the tank was set to 40° C. while stirring the water at 790 rpm. At this time, nitrogen gas was introduced into the reaction tank and allowed to flow in the reaction tank for 30 minutes to set the reaction atmosphere to a non-oxidizing atmosphere having an oxygen concentration of 1 vol % or less. Subsequently, appropriate amounts of 25 mass % sodium hydroxide aqueous solution and 25 mass % ammonia water were supplied into the reaction tank, and the pH value was adjusted to 12.5 at a liquid temperature of 25° C. and the ammonium ion concentration was adjusted to 10 g/L to form a pre-reaction aqueous solution.

At the same time, nickel sulfate, cobalt sulfate, manganese sulfate, and zirconium sulfate were dissolved in water so that the molar ratio of the respective metal elements was Ni:Mn:Co:Zr=38:30:32:0.2 to prepare a first raw material aqueous solution at 2 mol/L.

Next, the first raw material aqueous solution was supplied to the pre-reaction aqueous solution at 13 ml/min to form an aqueous solution for nuclear generation process, and nuclear generation was performed for 2.5 minutes. At this time, 25 mass % sodium hydroxide aqueous solution and 25 mass % ammonia water were supplied in a timely manner to maintain the pH value and ammonium ion concentration in the aqueous solution for nuclear generation in the ranges described above.

(Particle Growth Process)

After the nuclear generation was terminated, supply of all the aqueous solutions was temporarily stopped as well as sulfuric acid was added into the reaction tank to adjust the pH value to 11.6 at a liquid temperature of 25° C., and an aqueous solution for particle growth was thus formed. After it was confirmed that the pH value reached a predetermined value, the first raw material aqueous solution was supplied into the reaction tank to grow the nuclei (particles) generated in the nuclear generation process.

[Switching of Atmosphere]

In the particle growth process of the first crystallization process and second crystallization process, switching between a non-oxidizing atmosphere and an oxidizing atmosphere was performed four times. Specifically, a non-oxidizing atmosphere was switched to an oxidizing atmosphere (first time) and the oxidizing atmosphere was then switched to a non-oxidizing atmosphere (second time). The non-oxidizing atmosphere was further switched to an oxidizing atmosphere (third time) and the oxidizing atmosphere was then switched to a non-oxidizing atmosphere (fourth time). An atmosphere adjusted to have an oxygen concentration of 1 vol % or less by introduction of nitrogen gas was used as the non-oxidizing atmosphere, and the atmosphere was used as the oxidizing atmosphere. Switching of the reaction atmosphere was performed at the time point at which 20%, 40%, 60%, and 80% of the entire time during which particle growth was performed had elapsed.

[Second Crystallization Process]

As the second raw material aqueous solution, the first raw material aqueous solution and an aqueous solution containing tungsten were used. As the aqueous solution containing tungsten, a sodium tungstate aqueous solution was prepared by dissolving sodium tungstate dihydrate in water so that the molar ratio of the respective metal elements of the hydroxide obtained was $Ni:Mn:Co:Zr:W=38:30:32:0.2:0.6$.

The first aqueous solution was supplied, and the supply of the sodium tungstate aqueous solution (supply of the second raw material aqueous solution) into the reaction tank was performed two times as follows (see FIG. 3).

(i) From the time point at which 2/5 (40%) of the entire time during which particle growth was performed had elapsed to the time point at which 3/5 (60%) of the entire time had elapsed.

(ii) From the time point at which 4/5 (80%) of the entire time during which particle growth was performed had elapsed to the time point at which 5/5 (100%) of the entire time had elapsed (to the time point at which the particle growth ends).

The particle growth process was terminated by stopping the supply of all the aqueous solutions. Thereafter, the product obtained was washed with water, filtered, and dried to obtain a powdery metal composite hydroxide.

In the particle growth process in the first crystallization process and the second crystallization process, 25 mass % sodium hydroxide aqueous solution and 25 mass % ammonia water were supplied in a timely manner to maintain the pH value and ammonium ion concentration in the aqueous solution for particle growth in the ranges described above throughout these processes. The supply rate of the first raw material aqueous solution was set to be constant (13 ml/min) throughout the crystallization process.

(b) Evaluation of Metal Composite Hydroxide

It has been confirmed that this metal composite hydroxide is represented by a general formula: $Ni_{0.38}Mn_{0.30}Co_{0.32}Zr_{0.002}W_{0.006}(OH)_2$ by analysis using an ICP atomic emission spectrometer (ICPE-9000ICPE-9000 manufactured by Shimadzu Corporation).

The average particle size of the metal composite hydroxide was measured using a laser light diffraction scattering particle size analyzer (Microtrac HRA manufactured by Nikkiso Co., Ltd.) as well as d10 and d90 were measured, and [(d90–d10)/average particle size] that was an index indicating the spread of particle size distribution was calculated. As a result, it has been confirmed that the average particle size of the metal composite hydroxide is 5.4 μm and [(d90–d10)/average particle size] is 0.45.

In order to confirm the presence or absence of the tungsten-concentrated layer in the metal composite hydroxide and the thickness thereof, surface analysis of the metal composite hydroxide cross section was performed using an energy dispersive X-ray analyzer (EDX) mounted on a scanning transmission electron microscope (HD-2300A manufactured by Hitachi High-Technologies Corporation). As a result, it has been confirmed that a site (tungsten-concentrated layer) in which tungsten is present in a concentrated state is formed on the surface layer of the metal composite hydroxide and the average thickness thereof is in a range of 65 to 70 nm.

The tap density was measured using a shaking specific gravity measuring instrument (KRS-409 manufactured by Kuramochi Kagakukikai Seisakusho) after the metal composite hydroxide obtained was densely packed by a method in which the metal composite hydroxide was packed in a 20 ml graduated cylinder and the graduated cylinder was repeatedly allowed to freely fall from a height of 2 cm 500 times. As a result, it has been confirmed that the tap density is 1.15 g/cm³.

(c) Fabrication of Positive Electrode Active Material

The metal composite hydroxide obtained as described above was sufficiently mixed with lithium carbonate so that Li/Me was 1.14 using a shaker mixer device (TURBULA TypeT2C manufactured by Willy A. Bachofen (WAB) AG) to obtain a lithium mixture.

This lithium mixture was heated to 900° C. at a rate of temperature increase of 2.5° C./min in the air flow (oxygen concentration: 21 vol %), fired by being maintained at this temperature for 4 hours, and cooled to room temperature at a cooling rate of about 4° C./min. The positive electrode active material obtained in this manner was in an aggregated or slightly sintered state. For this reason, this positive electrode active material was crushed and the average particle size and particle size distribution thereof were adjusted.

(d) Evaluation of Positive Electrode Active Material

It has been confirmed that this positive electrode active material is represented by a general formula: $Li_{1.14}Ni_{0.38}Mn_{0.30}Co_{0.32}Zr_{0.002}W_{0.006}O_2$ by analysis using an ICP atomic emission spectrometer. The average particle size of the lithium-metal composite oxide was measured using a laser light diffraction scattering particle size analyzer as well as d10 and d90 were measured, and [(d90–d10)/average particle size] that was an index indicating the spread of particle size distribution was calculated. As a result, it has been confirmed that the average particle size of the lithium-metal composite oxide is 5.3 μm and [(d90–d10)/average particle size] is 0.43.

The crystallite diameter of (003) plane was measured using an X-ray diffractometer (X'Pert PRO manufactured by Spectris) and found to be 1,185 Å (118.5 nm). Surface analysis of the lithium-metal composite oxide cross section was performed using an energy dispersive X-ray analyzer (EDX) in order to confirm the distribution of tungsten in the lithium-metal composite oxide using a scanning transmission electron microscope. As a result, it has been confirmed that the lithium-metal composite oxide contains a large amount of tungsten in the surface layer of the primary particles in the vicinity of the surface of the secondary particles and the grain boundaries between the primary particles.

The tap density was evaluated under the same conditions as those for the metal composite hydroxide, and the BET specific surface area was evaluated using a specific surface area measuring apparatus (Macsorb 1200 series manufactured by MOUNTECH Co., Ltd.) that adopted the flow method-nitrogen gas adsorption method.

(e) Fabrication of Secondary Battery

Figure 8:
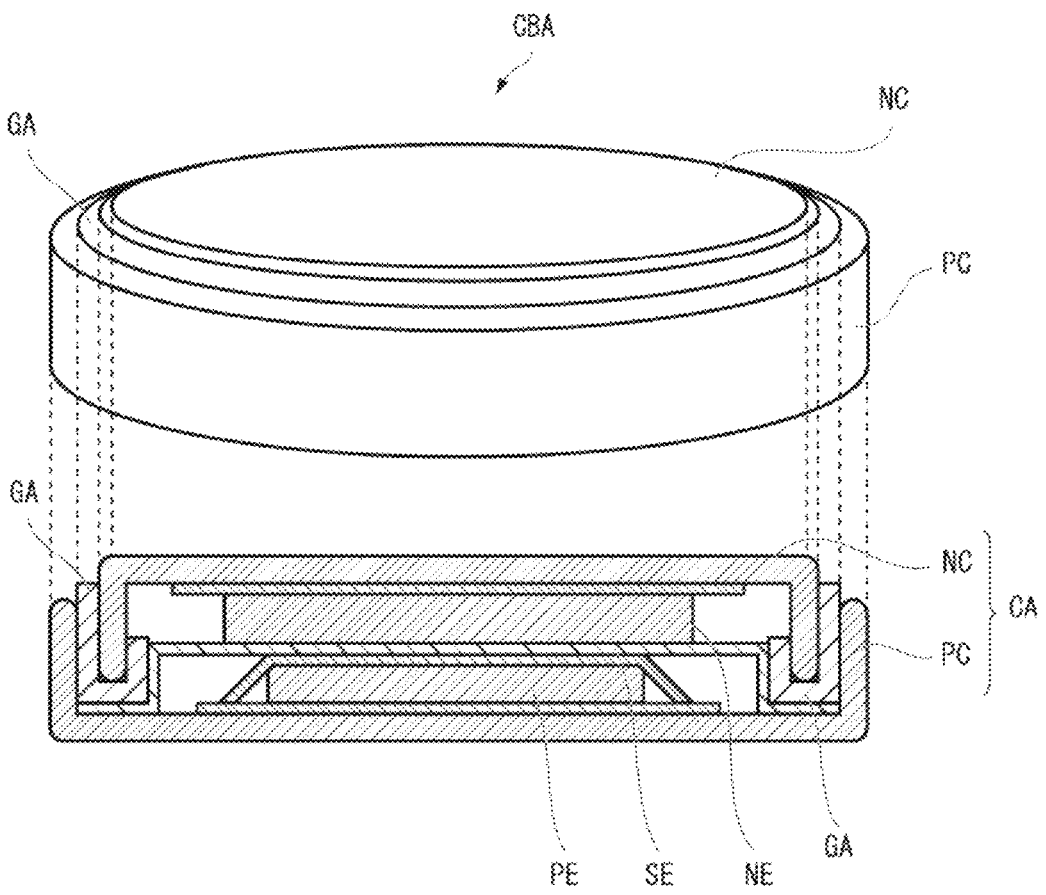
FIG. 8 is a schematic diagram illustrating a coin-type battery for evaluation used in Examples.

FIG. 8 is a diagram illustrating 2032 type coin-type battery CBA used for the evaluation of battery characteristics. Hereinafter, a method for fabricating a secondary battery will be described with reference to FIG. 8.

The positive electrode active material obtained as described above: 52.5 mg, acetylene black: 15 mg, and PTEE: 7.5 mg were mixed together, press-molded at a pressure of 100 MPa to have a diameter of 11 mm and a thickness of 100 μm, and then dried in a vacuum dryer at 120° C. for 12 hours to fabricate positive electrode PE.

Next, 2032 type coin-type battery CBA was fabricated using this positive electrode PE in a glove box in an Ar atmosphere of which the dew point was managed at −80° C. Lithium metal having a diameter of 17 mm and a thickness of 1 mm was used as negative electrode NE of this 2032 type coin-type battery, and an equivalent mixed solution (manufactured by TOMIYAMA PURE CHEMICAL INDUSTRIES, LTD.) of ethylene carbonate (EC) and diethyl carbonate (DEC) containing 1 M $LiClO_4$ as a supporting electrolyte was used as the electrolyte solution. A polyethylene porous film having a thickness of 25 μm was used as separator SE. The 2032 type coin-type battery CBA has gasket GA and is assembled into a coin-shaped battery using positive electrode can PC and negative electrode can NC.

(f) Battery Evaluation

[Resistance]

The resistance value was measured using the coin-type battery CBA assembled above by the alternating current impedance method at SOC of 20%, and the relative value based on Comparative Example 1 was calculated as the resistance value with respect to Reference (Ref.) and found to be 70.0%. These results are presented in Table 1.

Example 2

A metal composite hydroxide was obtained under the same conditions as in Example 1 except that sodium tungstate dihydrate was prepared so that the molar ratio of the respective metal elements of the hydroxide obtained was Ni:Mn:Co:Zr:W=38:30:32:0.2:0.5 as the aqueous solution containing tungsten. The evaluation results of the metal composite hydroxide obtained are presented in Table 1. Next, positive electrode active materials and secondary batteries were obtained under the same conditions as in Example 1 except that the metal composite hydroxides obtained were used as a precursor. The evaluation results of the positive electrode active material obtained are presented in Table 2.

Examples 3 to 5

Metal composite hydroxides were obtained under the same conditions as in Example 1 except that the addition timing (addition time) of the aqueous solution containing tungsten during the particle growth was changed as presented in Table 1. The evaluation results of the metal composite hydroxide obtained are presented in Table 1.

The distribution of W attained was analyzed by performing surface analysis of the cross section of the metal composite hydroxides obtained in Examples using an energy dispersive X-ray analyzer (EDX) mounted on a scanning transmission electron microscope (HD-2300A manufactured by Hitachi High-Technologies Corporation). As a result, in the metal composite hydroxides obtained in Examples, it has been confirmed that a site (tungsten-concentrated layer) in which tungsten is present in a concentrated state is detected from the surface layer of secondary particles and the thickness thereof is 20 nm or more and 100 nm or less.

Next, positive electrode active materials and secondary batteries were obtained under the same conditions as in Example 1 except that the metal composite hydroxides obtained were used as a precursor. The evaluation results of the metal composite hydroxides and positive electrode active materials obtained are presented in Table 2. The distribution of W attained was analyzed by performing surface analysis of the cross sections of the lithium-metal composite oxides obtained in Examples 2 to 8 using an energy dispersive X-ray analyzer (EDX) mounted on a scanning transmission electron microscope (HD-2300A manufactured by Hitachi High-Technologies Corporation). As a result, in the lithium-metal composite oxides obtained in Examples, it has been confirmed a large amount of tungsten is present in the surface layer of the primary particles in the vicinity of the surface of the secondary particles and at the grain boundaries between the primary particles.

Comparative Example 1

A metal composite hydroxide was obtained under the same conditions as in Example 1 except that a tungsten compound was added from the start point of the particle growth process (addition range was 100%). The evaluation results of the metal composite hydroxide obtained are presented in Table 1. Next, a positive electrode active material and a secondary battery were fabricated under the same conditions as in Example 1 except that the metal composite hydroxide obtained was used as a precursor. The evaluation results of the positive electrode active material and secondary battery obtained are presented in Table 1.

Comparative Example 2

A Positive Electrode Active Material ($Li_{1.14}Ni_{0.38}Mn_{0.30}Co_{0.32}Zr_{0.002}W_{0.005}O_2$) and a secondary battery were fabricated under the same conditions as in Example 1 below that a metal composite hydroxide ($Ni_{0.38}Mn_{0.30}Co_{0.32}Zr_{0.002}(OH)_2$) not containing tungsten was used and tungsten oxide was also added and mixed when mixing the metal composite hydroxide and lithium carbonate to obtain a lithium mixture. The evaluation results of the positive electrode active material and secondary battery obtained are presented in Table 1.

Comparative Example 3

A metal composite hydroxide, a positive electrode active material, and a secondary battery were fabricated under the same conditions as in Example 1 except that a sodium tungstate aqueous solution was not supplied in the second crystallization process when performing the crystallization process. The evaluation results of the metal composite hydroxide, positive electrode active material, and secondary battery obtained are presented in Table 1.

TABLE 1

| | | Particle growth process | | | | | |
|---|---|---|---|---|---|---|---|
| | W | | | | W addition time | | W amount |
| | compound addition method — | W addition start time % | W addition end time % | W addition range % | In non-oxidizing atmosphere % | In oxidizing atmosphere % | added during crystalization process Mol % |
| Example 1 | Internal addition | 40 | 60 | 20 | 100 | 0 | 0.6 |

TABLE 1-continued

| | | | | | | | |
|---|---|---|---|---|---|---|---|
| Example 2 | Internal addition | 80 | 100 | 20 | | | 0.5 |
| Example 3 | Internal addition | 80 | 100 | 20 | 100 | 0 | 0.6 |
| Example 4 | Internal addition | 75 | 100 | 25 | 80 | 20 | 0.6 |
| Example 5 | Internal addition | 60 | 100 | 40 | 50 | 50 | 0.6 |
| Comparative Example 1 | Internal addition | 0 | 100 | 100 | 60 | 40 | 0.6 |
| Comparative Example 2 | External addition | — | — | — | — | — | — |
| Comparative Example 3 | No addition | — | — | — | — | — | — |

Metal composite hydroxide

| | Composition | | | | | W-concentrated layer | | Volume average particle diameter | (d90-d10)/ | Tap |
|---|---|---|---|---|---|---|---|---|---|---|
| | Ni x | Mn y | Co z | W a | M (Zr) b | thickness nm | W yield % | MV μm | MV — | density g/cm³ |
| Example 1 | 0.38 | 0.30 | 0.32 | 0.0060 | 0.002 | 65 to 70 | 100 | 5.4 | 0.45 | 1.15 |
| Example 2 | 0.38 | 0.30 | 0.32 | 0.0050 | 0.002 | 50 to 60 | 100 | 5.4 | 0.45 | 1.14 |
| Example 3 | 0.38 | 0.30 | 0.32 | 0.0050 | 0.002 | 35 to 40 | 83 | 5.4 | 0.44 | 1.12 |
| Example 4 | 0.38 | 0.30 | 0.32 | 0.0050 | 0.002 | 40 to 45 | 83 | 5.4 | 0.43 | 1.13 |
| Example 5 | 0.38 | 0.30 | 0.32 | 0.0045 | 0.002 | 65 to 70 | 75 | 5.4 | 0.43 | 1.12 |
| Comparative Example 1 | 0.38 | 0.30 | 0.32 | 0.0040 | 0.002 | Not forrned | 66 | 5.4 | 0.45 | 1.11 |
| Comparative Example 2 | 0.38 | 0.30 | 0.32 | 0.0050 | 0.000 | — | — | 5.4 | 0.45 | 1.12 |
| Comparative Example 3 | 0.38 | 0.30 | 0.32 | 0.0000 | 0.002 | — | — | 5.4 | 0.45 | 1.13 |

TABLE 2

| | Lithium-metal composite oxide | | | | Battery |
|---|---|---|---|---|---|
| | | (003) Plane crystallite diameter | Tap density | Specific surface area | characteristics Positive electrode resistance |
| | Li/Me — | nm | g/cm³ | m²/g | % |
| Example 1 | 1.14 | 118.5 | 1.53 | 3.06 | 70.0 |
| Example 2 | 1.14 | 120.5 | 1.49 | 2.98 | 75.0 |
| Example 3 | 1.14 | 122.7 | 1.49 | 2.98 | 76.4 |
| Example 4 | 1.14 | 121.6 | 1.51 | 3.02 | 73.9 |
| Example 5 | 1.14 | 120.1 | 1.49 | 2.98 | 75.5 |
| Cornparative Example 1 | 1.14 | 107.4 | 1.48 | 2.96 | 100 (Reference) |
| Comparative Example 2 | 1.14 | 125.5 | 1.49 | 2.98 | 95.0 |
| Comparative Example 3 | 1.14 | 140.2 | 1.51 | 3.02 | 175.0 |

(Evaluation Results)

It has been confirmed that a tungsten-concentrated layer is formed on the surface of the metal composite hydroxides obtained in Examples. The positive electrode active materials obtained in Examples had a larger crystallite diameter and a lower positive electrode resistance value when being used as a positive electrode of a secondary battery as compared with that obtained in Comparative Example 1 in which tungsten was added throughout the crystallization process.

A tungsten-concentrated layer having a thickness of 100 nm or less was formed in the metal composite hydroxides obtained in Examples, and the positive electrode active materials obtained using these metal composite hydroxides as a precursor had the same degree of crystallite diameter as that in Comparative Example 2 in which a tungsten compound was externally added and had a lower positive electrode resistance value when being used as a positive electrode of a secondary battery as compared with that obtained in Comparative Example 2.

In the metal composite hydroxide obtained in Example 1, not only a tungsten-concentrated layer having a thickness of 100 nm or less was formed but also the yield of W with respect to the amount of W added was favorable and the W concentration in the metal composite hydroxide was high, and thus the positive electrode active material obtained using this metal composite hydroxide as a precursor had a lower positive electrode resistance value even as compared with those obtained in other Examples.

On the other hand, the positive electrode active material obtained in Comparative Example 3 in which tungsten was not added had a relatively larger crystallite diameter, but had a higher positive electrode resistance value when being used as a positive electrode of a secondary battery, and is indicated to be inferior in output characteristics as compared with those obtained in other Examples and Comparative Examples in which tungsten was added.

It should be noted that the technical scope of the present invention is not limited to the aspects described in the embodiments and the like. One or more of the requirements described in the embodiments and the like may be omitted. In addition, the requirements described in the embodiments and the like can be combined as appropriate. In addition, to the extent permitted by law, the disclosure of Japanese Patent Application No. 2018-201708, which is a Japanese patent application, and all the literatures cited in this specification is incorporated as part of the description of the text.

REFERENCE SIGNS LIST

10 Metal composite hydroxide
1 Primary particle

2 Secondary particle
3 Tungsten-concentrated layer
4 Center
5 Void
6 Solid portion
20 Lithium-metal composite oxide
21 Primary particle
22 Secondary particle
23 Compound containing tungsten and lithium
24 Center
25 Substantial portion
26 Void
CBA Coin-type battery
CA Case
PC Positive electrode can
NC Negative electrode can
GA Gasket
PE Positive electrode
NE Negative electrode
SE Separator

The invention claimed is:

1. A metal composite hydroxide that contains nickel, manganese, and tungsten and optionally cobalt and element M and has a mass ratio of the respective metal elements represented by Ni:Mn:Co:W:M=x:y:z:a:b (x+y+z=1, $0.3 \leq x \leq 0.95$, $0.05 \leq y \leq 0.55$, $0 \leq z \leq 0.4$, $0 < a \leq 0.1$, $0 \leq b \leq 0.1$, and M is one or more elements selected from the group consisting of Mg, Ca, Al, Ti, V, Cr, Zr, Nb, Mo, Hf, and Ta), the metal composite hydroxide comprising:

secondary particles with a plurality of aggregated primary particles, wherein the secondary particles have a multilayer structure including a center at which the primary particles are densely disposed, a void at which the primary particles are more sparsely disposed than the center, and a solid portion which corresponds to a surface portion of the secondary particles at which the primary particles are densely disposed from a center of the secondary particles toward a surface, a tap density is 0.75 g/cm³ or more and 1.35 g/cm³ or less, a tungsten-concentrated layer is formed at a surface part of the solid portion such that tungsten is contained in the surface part of the solid portion at a higher concentration than in the void and the center in the secondary particles, an average particle size of the composite hydroxide is 4.0 μm or more and 9.0 μm or less, and a thickness of the tungsten-concentrated layer is 100 nm or less.

2. The metal composite hydroxide according to claim 1, wherein a thickness of the tungsten-concentrated layer is 35 nm or more and 100 nm or less.

3. The metal composite hydroxide according to claim 1, wherein [(d90−d10)/average particle size] that is an index indicating spread of particle size distribution is 0.65 or less.

* * * * *